United States Patent
Saito

(10) Patent No.: US 10,745,618 B2
(45) Date of Patent: Aug. 18, 2020

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 57 days.

(21) Appl. No.: 15/616,928

(22) Filed: Jun. 8, 2017

(65) Prior Publication Data

US 2018/0002605 A1  Jan. 4, 2018

(30) Foreign Application Priority Data

Jul. 4, 2016 (JP) .................................. 2016-132350
Mar. 2, 2017 (JP) .................................. 2017-039117

(51) Int. Cl.
| | | |
|---|---|---|
| C09K 19/30 | (2006.01) | |
| C09K 19/34 | (2006.01) | |
| C09K 19/12 | (2006.01) | |
| G02F 1/1362 | (2006.01) | |
| G02F 1/137 | (2006.01) | |

(52) U.S. Cl.
CPC .......... *C09K 19/3402* (2013.01); *C09K 19/12* (2013.01); *C09K 19/3003* (2013.01); *C09K 19/3068* (2013.01); *C09K 19/3098* (2013.01); *G02F 1/1362* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3025* (2013.01); *C09K 2019/3027* (2013.01); *C09K 2019/3071* (2013.01); *C09K 2019/3078* (2013.01); *C09K 2019/3422* (2013.01); *C09K 2019/3425* (2013.01); *G02F 2001/13712* (2013.01)

(58) Field of Classification Search
CPC ..................................................... C09K 19/34
See application file for complete search history.

(56) References Cited

U.S. PATENT DOCUMENTS

| | | | | |
|---|---|---|---|---|
| 6,395,353 B2* | 5/2002 | Yanai | ................... | C09K 19/406 |
| | | | | 252/299.63 |
| 6,558,758 B1* | 5/2003 | Yanai | ................. | C09K 19/3402 |
| | | | | 252/299.61 |
| 8,158,219 B2* | 4/2012 | Hattori | ................... | C09K 19/12 |
| | | | | 252/299.61 |
| 2008/0011984 A1* | 1/2008 | Fujita | ................. | C09K 19/3001 |
| | | | | 252/299.63 |
| 2011/0140040 A1* | 6/2011 | Hattori | ................... | C09K 19/12 |
| | | | | 252/299.61 |
| 2013/0277609 A1* | 10/2013 | Goto | ...................... | C09K 19/12 |
| | | | | 252/299.61 |
| 2014/0010973 A1* | 1/2014 | Gotoh | ................ | C09K 19/3402 |
| | | | | 428/1.2 |

FOREIGN PATENT DOCUMENTS

JP         2001115161         4/2001

* cited by examiner

*Primary Examiner* — Chanceity N Robinson
(74) *Attorney, Agent, or Firm* — JCIPRNET

(57) ABSTRACT

A liquid crystal composition that satisfies at least one of characteristics such as a high maximum temperature, a low minimum temperature, a small viscosity, a suitable optical anisotropy and a large negative dielectric anisotropy, or that has a suitable balance between at least two of these characteristics, and an AM device including this composition. The nematic liquid crystal composition includes a specific compound having a large negative dielectric anisotropy as a first component and a specific compound having a small viscosity as a second component, and may include a specific compound having a negative dielectric anisotropy as a third component, and a specific compound having a high maximum temperature or a small viscosity as a fourth component, or a specific compound having a polymerizable group as an additive.

13 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2016-132350, filed on Jul. 4, 2016, and Japan application serial no. 2017-039117, filed on Mar. 2, 2017. The entirety of each of the above-mentioned patent applications is hereby incorporated by reference herein and made a part of this specification.

TECHNICAL FIELD

The invention relates to a liquid crystal composition, a liquid crystal display device including this composition and so forth. It relates especially to a liquid crystal composition having negative dielectric anisotropy, and a liquid crystal display device including this composition and having a mode such as IPS, VA, FFS or FPA. It also relates to a liquid crystal display device with a polymer sustained alignment type.

TECHNICAL BACKGROUND

In a liquid crystal display device, a classification based on an operating mode for liquid crystal molecules includes modes such as PC (phase change), TN (twisted nematic), STN (super twisted nematic), ECB (electrically controlled birefringence), OCB (optically compensated bend), IPS (in-plane switching), VA (vertical alignment), FFS (fringe field switching) and FPA (field-induced photo-reactive alignment). A classification based on a driving mode in the device includes PM (passive matrix) and AM (active matrix). The PM is classified into static, multiplex and so forth, and the AM is classified into TFT (thin film transistor), MIM (metal-insulator-metal) and so forth. The TFT is further classified into amorphous silicon and polycrystal silicon. The latter is classified into a high temperature type and a low temperature type depending on the production process. A classification based on a light source includes a reflection type utilizing natural light, a transmission type utilizing a backlight and a semi-transmission type utilizing both natural light and a backlight.

The liquid crystal display device includes a liquid crystal composition having a nematic phase. This composition has suitable characteristics. An AM device having good characteristics can be obtained by improving the characteristics of this composition. Table 1 below summarizes the relationship between these characteristics. The characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Response time that is one millisecond shorter than that of the other devices is desirable. Thus a small viscosity of the composition is desirable. A small viscosity at a low temperature is more desirable.

TABLE 1

Characteristics of compositions and characteristics of AM devices

| No. | Characteristics of compositions | Characteristics of AM devices |
|---|---|---|
| 1 | a wide temperature range of a nematic phase | a wide temperature range in which the device can be used |
| 2 | a small viscosity | a short response time |
| 3 | a suitable optical anisotropy | a large contrast ratio |
| 4 | a large positive or negative dielectric anisotropy | a low threshold voltage and low power consumption, a large contrast ratio |
| 5 | a large specific resistance | a large voltage holding ratio and a large contrast ratio |
| 6 | a high stability to ultraviolet light or heat | a long service life |

The optical anisotropy of the composition relates to the contrast ratio of the device. A large optical anisotropy or a small optical anisotropy, namely a suitable optical anisotropy, is necessary depending on the mode of the device. The product (Δn×d) of the optical anisotropy (Δn) of the composition and the cell gap (d) of the device is designed so as to maximize the contrast ratio. A suitable value of the product depends on the type of operating mode. The value is in the range of approximately 0.30 micrometers to approximately 0.40 micrometers for a device having a VA mode, and in the range of approximately 0.20 micrometers to approximately 0.30 micrometers for a device having an IPS mode or an FFS mode. In these cases, a composition having a large optical anisotropy is desirable for a device having a small cell gap. A large dielectric anisotropy of the composition contributes to a low threshold voltage, low power consumption and a large contrast ratio of the device. A large dielectric anisotropy is thus desirable. A large specific resistance of the composition contributes to a large voltage holding ratio and a large contrast ratio of the device. It is thus desirable that a composition should have a large specific resistance in the initial stages. It is desirable that a composition should have a large specific resistance, after it has been used for a long time. The stability of the composition to ultraviolet light or heat relates to the service life of the device. The device has a long service life when the stability is high. Characteristics of this kind are desirable for an AM device used for a liquid crystal projector, a liquid crystal television and so forth.

In a conventional liquid crystal display device, the homeotropic alignment of liquid crystal molecules is achieved by a specific polyimide alignment film. A polymer is combined with the alignment film for a liquid crystal display device with a polymer sustained alignment (PSA) type. First, a composition to which a small amount of polymerizable compound has been added is poured into a device. Next, the composition is irradiated with ultraviolet light, while a voltage is applied between the substrates of this device. The polymerizable compound is polymerized to give a network structure of a polymer in the composition. In this composition, the polymer makes it possible to adjust the alignment of liquid crystal molecules, and thus the response time of the device is decreased and image burn-in is improved. Such effect of the polymer can be expected for a device having a mode such as TN, ECB, OCB, IPS, VA, FFS or FPA.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device with a polymer sustained alignment type. Compounds included in the first component of the invention have been disclosed in the following patent document No. 1.

PRIOR ART

Patent Document

Patent document No. 1: JP 2001-115161 A.

SUMMARY OF THE INVENTION

Subject to be Solved by the Invention

The invention provides a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. The invention further provides a liquid crystal composition that is suitably balanced between at least two of these characteristics. The invention also provides a liquid crystal display device including such a composition. The invention yet further provides an AM device having characteristics such as a short response time, a large voltage holding ratio, a low threshold voltage, a large contrast ratio and a long service life.

Means for Solving the Subject

The invention relates to a liquid crystal composition having negative dielectric anisotropy and including at least one compound selected from the group of compounds represented by formula (1) as a first component and at least one compound selected from the group of compounds represented by formula (2) as a second component, and to a liquid crystal display device including the composition.

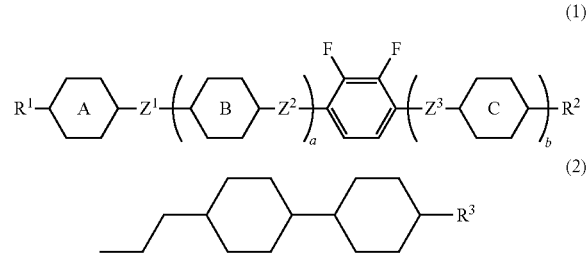

in formula (1) and formula (2), $R^1$ and $R^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine; $R^3$ is ethyl, vinyl or 1-propenyl; ring A is tetrahydropyran-2,5-diyl; ring B and ring C are independently 2-fluoro-1,4-phenylene or 2,3-difluoro-1,4-phenylene; $Z^1$, $Z^2$ and $Z^3$ are independently a single bond, ethylene, carbonyloxy or methyleneoxy; and a and b are independently 0 or 1, and the sum of a and b is 1.

Effect of the Invention

One of the advantages of the invention is to provide a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. Another advantage is to provide a liquid crystal composition that is suitably balanced between at least two of these characteristics. Another advantage is to provide a liquid crystal display device including such a composition. Another advantage is to provide an AM device having characteristics such as a short response time, a large voltage holding ratio, a low threshold voltage, a large contrast ratio and a long service life.

EMBODIMENT TO CARRY OUT THE INVENTION

The usage of the terms in the specification and claims is as follows. "Liquid crystal composition" and "liquid crystal display device" are sometimes abbreviated to "composition" and "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, and for a compound having no liquid crystal phases but being mixed with a composition for the purpose of adjusting the characteristics, such as the temperature range of a nematic phase, the viscosity and the dielectric anisotropy. This compound has a six-membered ring such as 1,4-cyclohexylene or 1,4-phenylene, and its molecular structure is rod-like. "Polymerizable compound" is a compound that is added to a composition in order to form a polymer in it. A liquid crystal compound having alkenyl is not polymerizable in that sense.

A liquid crystal composition is prepared by mixing a plurality of liquid crystal compounds. An additive such as an optically active compound, an antioxidant, an ultraviolet light absorber, a coloring matter, an antifoaming agent, a polymerizable compound, a polymerization initiator, a polymerization inhibitor and a polar compound is added to this liquid crystal composition as required. Even if an additive is added, the ratio of a liquid crystal compound is expressed as a percentage by weight (% by weight) based on the weight of the liquid crystal composition excluding the additive. The ratio of the additive is expressed as a percentage by weight (% by weight) based on the weight of the liquid crystal composition excluding the additive. That is to say, the ratio of the additive or liquid crystal compound is calculated on the basis of the total weight of the liquid crystal compounds. Weight parts per million (ppm) is sometimes used. The ratio of the polymerization initiator and the polymerization inhibitor is exceptionally expressed on the basis of the weight of the polymerizable compound.

"The upper limit of the temperature range of a nematic phase" is sometimes abbreviated to "the maximum temperature." "A lower limit of the temperature range of a nematic phase" is sometimes abbreviated to "the minimum temperature." That "specific resistance is large" means that a composition has a large specific resistance in the initial stages, and that the composition has a large specific resistance, after it has been used for a long time. That "a voltage holding ratio is large" means that a device has a large voltage holding ratio at a temperature close to the maximum temperature as well as at room temperature in the initial stages, and that the device has a large voltage holding ratio at a temperature close to the maximum temperature as well as at room temperature, after it has been used for a long time. In compositions or devices, characteristics before or after a long-term test (including an accelerated aging test) are sometimes studied. The expression "increase the dielectric anisotropy" means that its value increases positively when the composition has positive dielectric anisotropy, and that its value increases negatively when the composition has negative dielectric anisotropy.

A compound represented by formula (1) is sometimes abbreviated to "compound (1)." At least one compound selected from the group of compounds represented by formula (1) is sometimes abbreviated to "compound (1)." "Compound (1)" means one compound, a mixture of two compounds or a mixture of three or more compounds represented by formula (1). This applies to a compound represented by another formula. The expression "at least one 'A.'" means that the number of 'A' is arbitrary. The expression "at least one 'A' may be replaced by 'B'" means that the position of 'A' is arbitrary when the number of 'A' is one, and the positions can also be selected without restriction when the number of 'A' is two or more. This rule also applies to the expression "at least one 'A' has been replaced by 'B'."

An expression such as "at least one —$CH_2$— may be replaced by —O—" is used in this specification. In this case, —$CH_2$—$CH_2$—$CH_2$— may be transformed to —O—$CH_2$—O— by replacement of nonadjacent —$CH_2$— with —O—. However, adjacent —$CH_2$— should not be replaced by —O—. This is because of the formation of —O—O—$CH_2$-(peroxide) by this replacement. That is to say, the expression means both "one —$CH_2$— may be replaced by —O—" and "at least two nonadjacent —$CH_2$— may be replaced by —O—." The same rule applies to the replacement by a divalent group such as —CH=CH— or —COO—, as well as the replacement by —O—.

The symbol for the terminal group, $R^1$, is used for a plurality of compounds in the chemical formulas of component compounds. In these compounds, two groups represented by two arbitrary $R^1$ may be the same or different. In one case, for example, $R^1$ of compound (1-1) is ethyl and $R^1$ of compound (1-2) is ethyl. In another case, $R^1$ of compound (1-1) is ethyl and $R^1$ of compound (1-2) is propyl. The same rule applies to other symbols. In formula (3), two of ring D are present when subscript 'c' is 2. In this compound, two groups represented by two of ring D may be the same or different. The same rule applies to arbitrary two of ring D, when subscript 'c' is greater than 2. The same rule applies to the symbols such as $Z^4$ and ring G. The same rule applies to the case of two -$Sp^2$-$P^2$ in compound (5-27), for instance.

A symbol such as A, B, C or D surrounded by a hexagon corresponds to a ring such as ring A, ring B, ring C or ring D, respectively, and represents a ring such as a six-membered ring or a condensed ring. In compound (5), an oblique line that intersects one side of the hexagon means that arbitrary hydrogen on the ring may be replaced by a group such as -$Sp^1$-$P^1$. A subscript such as 'g' shows the number of a group that has been replaced. There is no replacement when subscript 'g' is 0 (zero). A plurality of -$Sp^1$-$P^1$ are present on the ring J when subscript 'g' is 2 or more. A plurality of groups represented by -$Sp^1$-$P^1$ may be the same or different. In the expression "ring A and ring B are independently X, Y or Z", "independently" is used since the subject is plural. When the subject is "ring A", "independently" is not used, since the subject is singular.

2-Fluoro-1,4-phenylene means the two divalent groups described below. Fluorine may be facing left (L) or facing right (R) in a chemical formula. The same rule applies to an asymmetric divalent group formed from a ring by removing two hydrogens, such as tetrahydropyran-2,5-diyl. The same rule also applies to a bonding group such as carbonyloxy (—COO— or —OCO—).

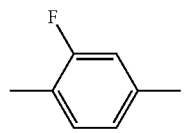
(L)

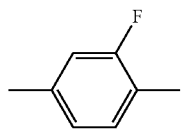
(R)

Alkyl in a liquid crystal compound is straight-chain or branched-chain, and does not include cycloalkyl. Straight-chain alkyl is preferable to branched-chain alkyl. This applies to a terminal group such as alkoxy and alkenyl. With regard to the configuration of 1,4-cyclohexylene, trans is preferable to cis for increasing the maximum temperature.

The invention includes the following items.

Item 1. A liquid crystal composition having negative dielectric anisotropy and including at least one compound selected from the group of compounds represented by formula (1) as a first component and at least one compound selected from the group of compounds represented by formula (2) as a second component:

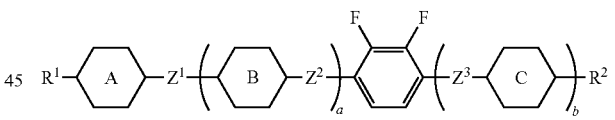
(1)

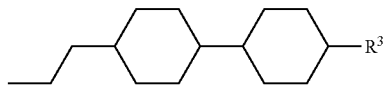
(2)

in formula (1) and formula (2), $R^1$ and $R^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine; $R^3$ is ethyl, vinyl or 1-propenyl; ring A is tetrahydropyran-2,5-diyl; ring B and ring C are independently 2-fluoro-1,4-phenylene or 2,3-difluoro-1,4-phenylene; $Z^1$, $Z^2$ and $Z^3$ are independently a single bond, ethylene, carbonyloxy or methyleneoxy; and one of a and b is 0, and the other is 1.

Item 2. The liquid crystal composition according to item 1, including at least one compound selected from the group of compounds represented by formula (1-1) to formula (1-6) as a first component:

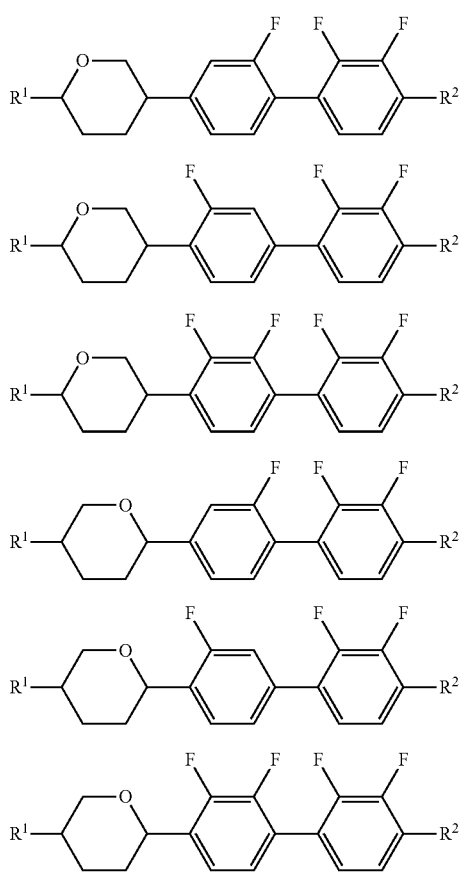

in formula (1-1) to formula (1-6), $R^1$ and $R^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine.

Item 3. The liquid crystal composition according to item 1 or 2, wherein the ratio of the first component is in the range of 5% by weight to 25% by weight, and the ratio of the second component is in the range of 15% by weight to 70% by weight.

Item 4. The liquid crystal composition according to any one of items 1 to 3, including at least one compound selected from the group of compounds represented by formula (3) as a third component:

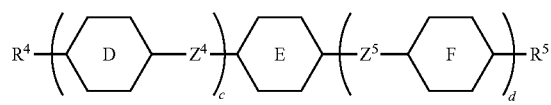

in formula (3), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine; ring D and ring F are independently 1,4-cyclohexylene, 1,4-cyclohexenylene, 1,4-phenylene, 1,4-phenylene in which at least one hydrogen has been replaced by fluorine or chlorine, naphthalene-2,6-diyl, naphthalene-2,6-diyl in which at least one hydrogen has been replaced by fluorine or chlorine, chromane-2,6-diyl or chromane-2,6-diyl in which at least one hydrogen has been replaced by fluorine or chlorine; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochromane-2,6-diyl; $Z^4$ and $Z^5$ are independently a single bond, ethylene, carbonyloxy or methyleneoxy; and c is 1, 2 or 3, d is 0 or 1, and the sum of c and d is 3 or less.

Item 5. The liquid crystal composition according to any one of items 1 to 4, including at least one compound selected from the group of compounds represented by formula (3-1) to formula (3-20) as a third component:

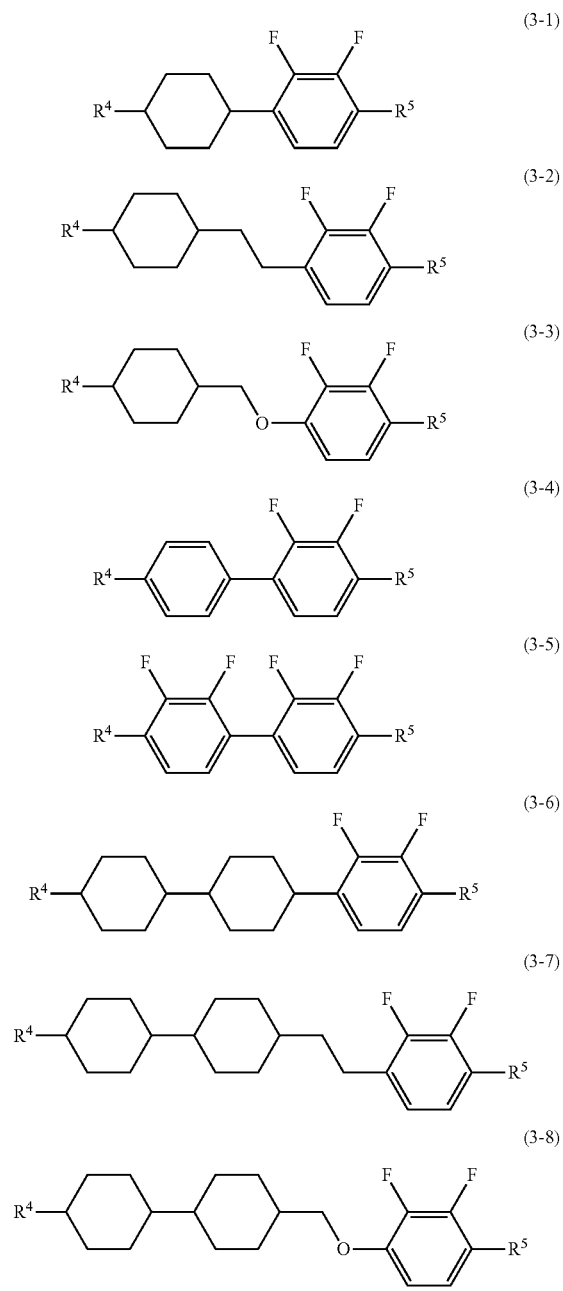

-continued

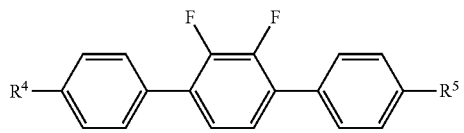
(3-9)

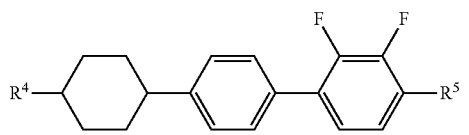
(3-10)

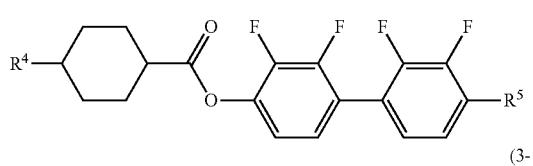
(3-11)

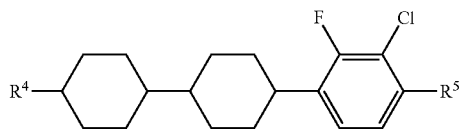
(3-12)

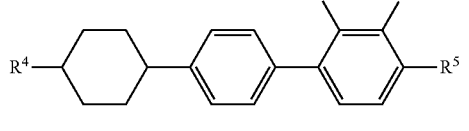
(3-13)

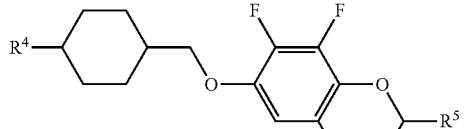
(3-14)

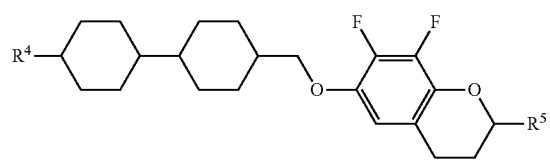
(3-15)

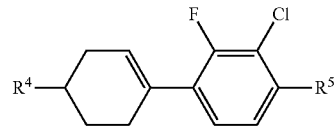
(3-16)

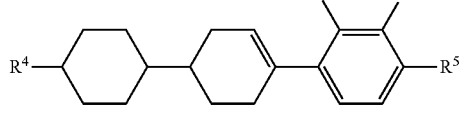
(3-17)

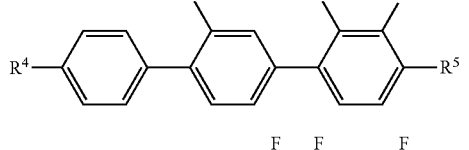
(3-18)

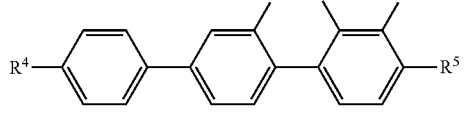
(3-19)

-continued

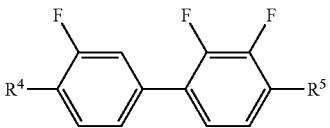
(3-20)

in formula (3-1) to formula (3-20), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine.

Item 6. The liquid crystal composition according to item 4 or 5, wherein the ratio of the third component is in the range of 20% by weight to 75% by weight.

Item 7. The liquid crystal composition according to any one of items 1 to 6, including at least one compound selected from the group of compounds represented by formula (4) as a fourth component:

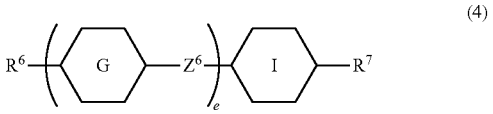
(4)

in formula (4), $R^6$ and $R^7$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine; ring G and ring I are independently 1,4-cyclohexylene, 1,4-phenylene, 2-fluoro-1,4-phenylene or 2,5-difluoro-1,4-phenylene; $Z^6$ is a single bond, ethylene or carbonyloxy; e is 1, 2 or 3; and ring I is 1,4-phenylene when e is 1.

Item 8. The liquid crystal composition according to any one of items 1 to 7, including at least one compound selected from the group of compounds represented by formula (4-1) to formula (4-12) as a fourth component:

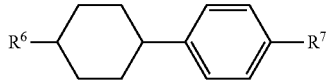
(4-1)

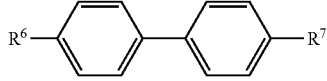
(4-2)

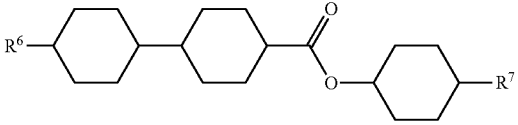
(4-3)

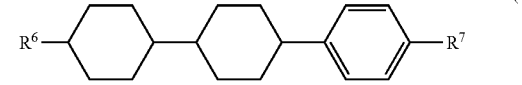
(4-4)

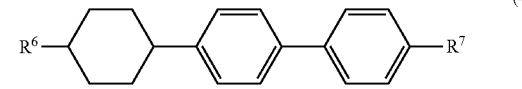
(4-5)

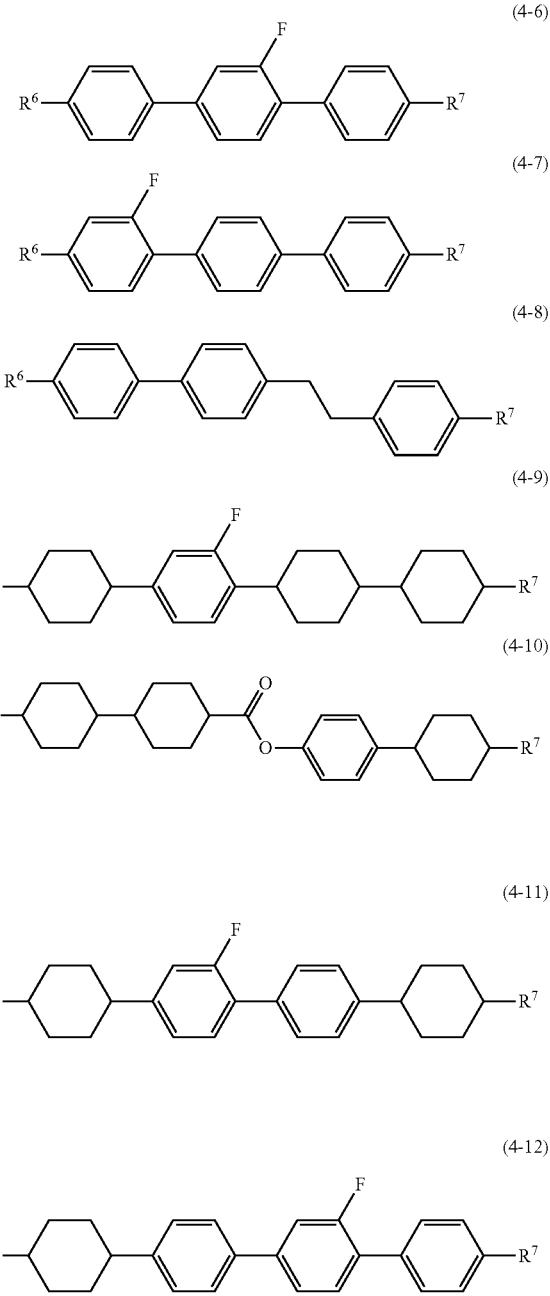

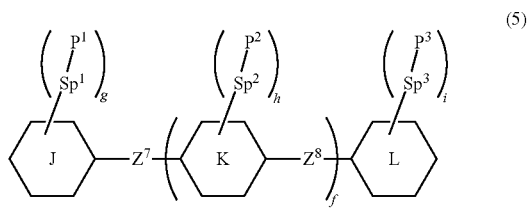

in formula (4-1) to formula (4-12), $R^6$ and $R^7$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine.

Item 9. The liquid crystal composition according to item 7 or 8, wherein the ratio of the fourth component is in the range of 2% by weight to 30% by weight.

Item 10. The liquid crystal composition according to any one of items 1 to 9, including at least one compound selected from the group of polymerizable compounds represented by formula (5) as an additive:

in formula (5), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^7$ and $Z^8$ are independently a single bond or alkylene having 1 to 10 carbons, and in the alkylene at least one —$CH_2$— may be replaced by —O—, —CO—, —COO— or —OCO— and at least one —$CH_2$—$CH_2$— may be replaced by —CH=CH—, —C($CH_3$)=CH—, —CH=C($CH_3$)— or —C($CH_3$)=C($CH_3$)—, and in these groups at least one hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO— and at least one —$CH_2$—$CH_2$— may be replaced by —CH=CH— or —C≡C—, and in these groups at least one hydrogen may be replaced by fluorine or chlorine; f is 0, 1 or 2; and g, h and i are independently 0, 1, 2, 3 or 4, and the sum of g, h and i is 1 or more.

Item 11. The liquid crystal composition according to item 10, wherein in formula (5), $P^1$, $P^2$ and $P^3$ are independently a group selected from the group of polymerizable groups represented by formula (P-1) to formula (P-5):

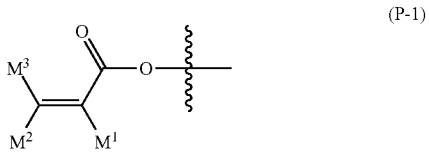

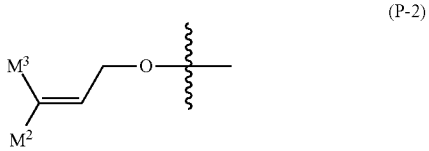

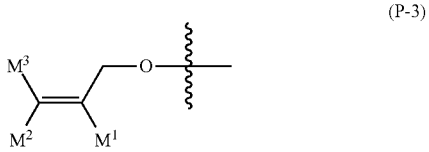

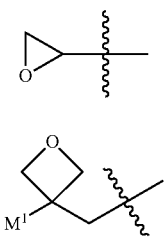
(P-4)

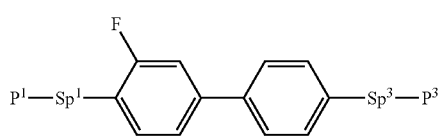
(P-5)

in formula (P-1) to formula (P-5), $M^1$, $M^2$ and $M^3$ are independently hydrogen, fluorine, alkyl having 1 to 5 carbons or alkyl having 1 to S carbons in which at least one hydrogen has been replaced by fluorine or chlorine.

Item 12. The liquid crystal composition according to any one of items 1 to 11, including at least one compound selected from the group of polymerizable compounds represented by formula (5-1) to formula (5-27) as an additive:

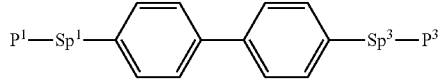
(5-1)

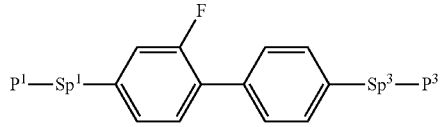
(5-2)

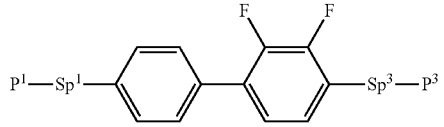
(5-3)

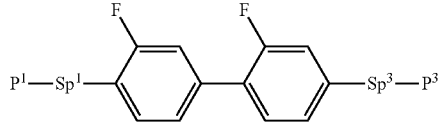
(5-4)

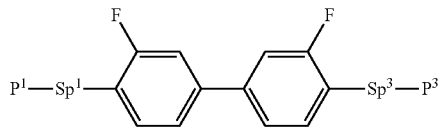
(5-5)

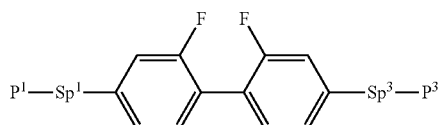
(5-6)

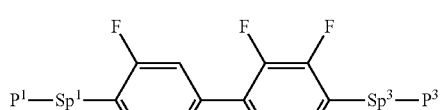
(5-7)

(5-8)

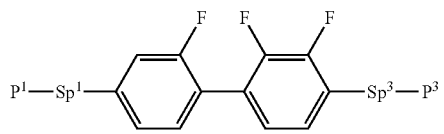
(5-9)

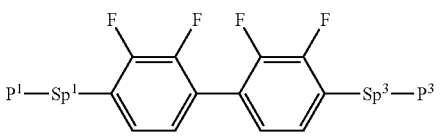
(5-10)

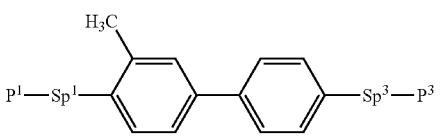
(5-11)

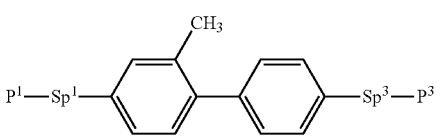
(5-12)

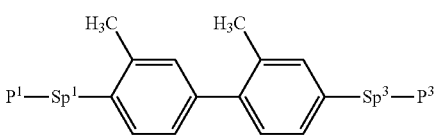
(5-13)

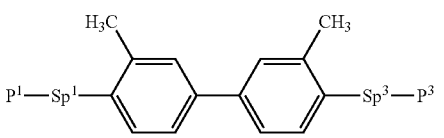
(5-14)

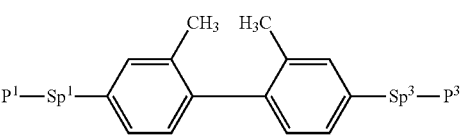
(5-15)

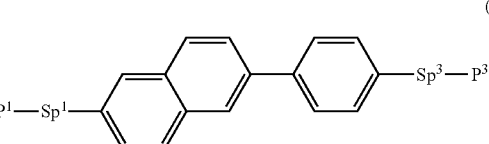
(5-16)

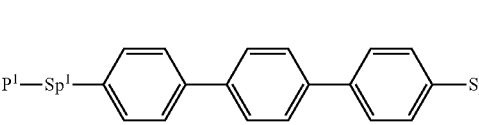
(5-17)

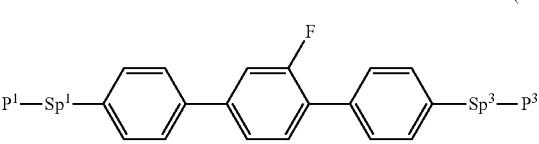
(5-18)

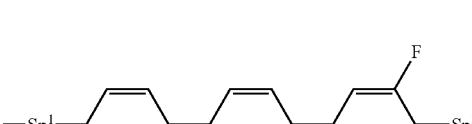
(5-19)

-continued

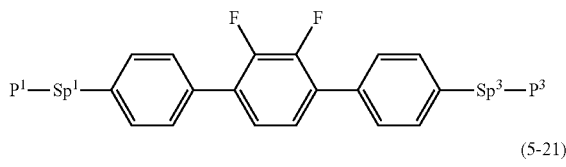
(5-20)

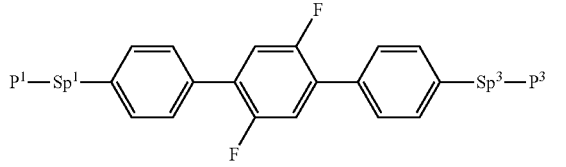
(5-21)

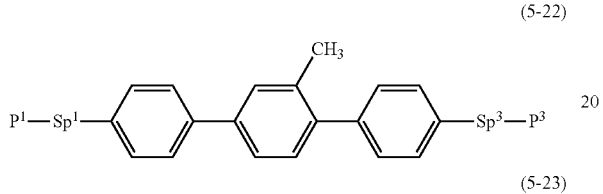
(5-22)

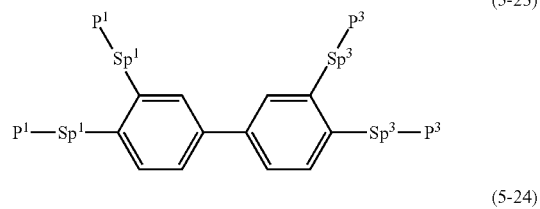
(5-23)

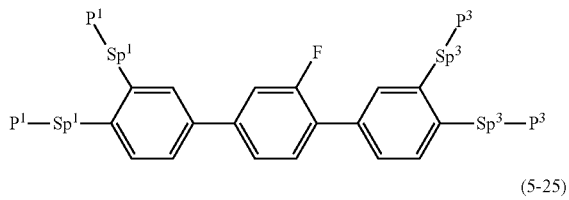
(5-24)

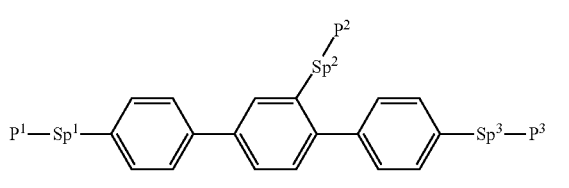
(5-25)

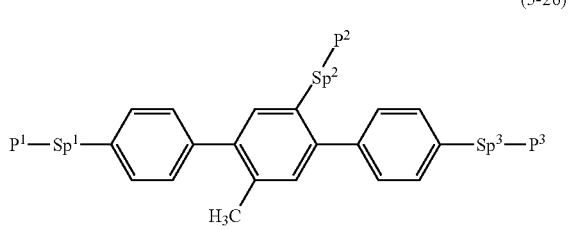
(5-26)

(5-27)

in formula (5-1) to formula (5-27), $P^1$, $P^2$ and $P^3$ are independently a group selected from the group of polymerizable groups represented by formula (P-1) to formula (P-3);

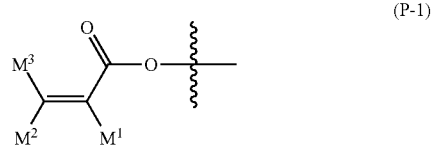
(P-1)

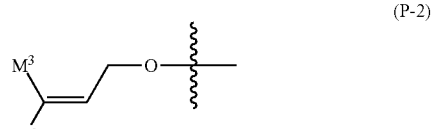
(P-2)

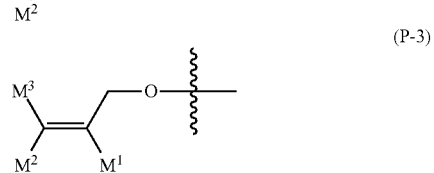
(P-3)

wherein, $M^1$, $M^2$ and $M^3$ are independently hydrogen, fluorine, alkyl having 1 to 5 carbons or alkyl having 1 to 5 carbons in which at least one hydrogen has been replaced by fluorine or chlorine; and $Sp^1$, $Sp^2$ and $Sp^3$ are independently a single bond or alkylene having 1 to 10 carbons, and in the alkylene at least one —CH$_2$— may be replaced by —O—, —COO—, —OCO— or —OCOO— and at least one —CH$_2$—CH$_2$— may be replaced by —CH=CH— or —C≡C—, and in these groups at least one hydrogen may be replaced by fluorine or chlorine.

Item 13. The liquid crystal composition according to any one of items 10 to 12, wherein the ratio of the additive is in the range of 0.03% by weight to 10% by weight.

Item 14. A liquid crystal display device including the liquid crystal composition according to any one of items 1 to 13.

Item 15. The liquid crystal display device according to item 14, wherein the operating mode of the liquid crystal display device is an IPS mode, a VA mode, an FFS mode or an FPA mode, and the driving mode of the liquid crystal display device is an active matrix mode.

Item 16. A liquid crystal display device with a polymer sustained alignment type including a liquid crystal composition according to any one of items 1 to 13, wherein the additive included in the liquid crystal composition has been polymerized.

Item 17. Use of the liquid crystal composition according to any one of items 1 to 13, for the liquid crystal display device.

Item 18. Use of the liquid crystal composition according to any one of items 1 to 13, for the liquid crystal display device with a polymer sustained alignment type.

The invention also includes the following items. (a) The composition described above, further including at least one of additives such as an optically active compound, an antioxidant, an ultraviolet light absorber, a coloring matter, an antifoaming agent, a polymerizable compound, a polymerization initiator, a polymerization inhibitor, and a polar compound. (b) The AM device including the composition described above. (c) An AM device with a polymer sustained alignment (PSA) type, including the composition described above that further includes a polymerizable compound. (d) An AM device with a polymer sustained alignment (PSA) type including the composition described above, where a polymerizable compound in this composition is polymerized. (e) A device including the composition described above, having a mode of PC, TN, STN, ECB, OCB, IPS, VA, FFS or FPA. (f) A transmission-type device including the composition described above. (g) Use of the composition described above, as a composition having a nematic phase. (h) Use of the composition prepared by the addition of an optically active compound to the composition described above, as an optically active composition.

The composition of the invention will be explained in the following order: First, the structure of the composition will be explained. Second, the main characteristics of the component compounds and the main effects of these compounds on the composition will be explained. Third, a combination of the components in the composition, a desirable ratio of the components and its basis will be explained. Fourth, a desirable embodiment of the component compounds will be explained. Fifth, desirable component compounds will be shown. Sixth, additives that may be added to the composition will be explained. Seventh, methods for synthesizing the component compounds will be explained. Last, the use of the composition will be explained.

First, the structure of the composition will be explained. The compositions of the invention are classified into composition A and composition B. Composition A may further include any other liquid crystal compound, an additive and so forth, in addition to liquid crystal compounds selected from compound (1), compound (2), compound (3), and compound (4). "Any other liquid crystal compound" is a liquid crystal compound that is different from compound (1), compound (2), compound (3), and compound (4). Such a compound is mixed with the composition for the purpose of further adjusting the characteristics. The additive includes an optically active compound, an antioxidant, an ultraviolet light absorber, a coloring matter, an antifoaming agent, a polymerizable compound, a polymerization initiator, a polymerization inhibitor and a polar compound.

Composition B consists essentially of liquid crystal compounds selected from compound (1), compound (2), compound (3), and compound (4). The term "essentially" means that the composition may include an additive, but does not include any other liquid crystal compound. Composition B has a smaller number of components than composition A. Composition B is preferable to composition A in view of cost reduction. Composition A is preferable to composition B in view of the fact that characteristics can be further adjusted by mixing with any other liquid crystal compound.

Second, the main characteristics of the component compounds and the main effects of these compounds on the composition will be explained. Table 2 summarizes the main characteristics of the component compounds based on the effects of the invention. In Table 2, the symbol L stands for "large" or "high", the symbol M stands for "medium", and the symbol S stands for "small" or "low." The symbols L, M and S mean a classification based on a qualitative comparison among the component compounds, and the symbol 0 means that the value is close to zero.

TABLE 2

Characteristics of liquid crystal compounds

| Characteristics | Compound (1) | Compound (2) | Compound (3) | Compound (4) |
|---|---|---|---|---|
| Maximum temperature | M-L | M | S-L | S-L |
| Viscosity | M-L | S | M-L | S-M |
| Optical anisotropy | M-L | S | M-L | S-L |

TABLE 2-continued

Characteristics of liquid crystal compounds

| Characteristics | Compound (1) | Compound (2) | Compound (3) | Compound (4) |
|---|---|---|---|---|
| Dielectric anisotropy | M-L[1)] | 0 | M-L[1)] | 0 |
| Specific resistance | L | L | L | L |

[1)]Dielectric anisotropy is negative and the symbol shows the magnitude of the absolute value..

The main effects of the component compounds on the characteristics of the composition upon mixing the component compounds with the composition are as follows. Compound (1) increases the dielectric anisotropy. Compound (2) decreases the viscosity. Compound (3) increases the dielectric anisotropy, and decreases the minimum temperature. Compound (4) increases the maximum temperature or decreases the viscosity. Compound (5) gives a polymer by polymerization, the polymer decreases the response time of a device, and improves image burn-in.

Third, a combination of the components in the composition, a desirable ratio of the components and its basis will be explained. A desirable combination of the components in the composition is first component plus second component, first component plus second component plus third component, first component plus second component plus fourth component, first component plus second component plus additive, first component plus second component plus third component plus fourth component, first component plus second component plus third component plus additive, first component plus second component plus fourth component plus additive, and first component plus second component plus third component plus fourth component plus additive. A more desirable combination is first component plus second component plus third component plus fourth component and first component plus second component plus third component plus fourth component plus additive.

A desirable ratio of the first component is approximately 5% by weight or more for increasing the dielectric anisotropy, and approximately 25% by weight or less for decreasing the viscosity. A more desirable ratio is in the range of approximately 5% by weight to approximately 20% by weight. An especially desirable ratio is in the range of approximately 5% by weight to approximately 15% by weight.

A desirable ratio of the second component is approximately 15% by weight or more for decreasing the viscosity, and approximately 70% by weight or less for increasing the dielectric anisotropy. A more desirable ratio is in the range of approximately 15% by weight to approximately 60% by weight. An especially desirable ratio is in the range of approximately 20% by weight to approximately 50% by weight.

A desirable ratio of the third component is approximately 20% by weight or more for increasing the dielectric anisotropy, and approximately 75% by weight or less for decreasing the minimum temperature. A more desirable ratio is in the range of approximately 25% by weight to approximately 70% by weight. An especially desirable ratio is in the range of approximately 30% by weight to approximately 65% by weight.

A desirable ratio of the fourth component is approximately 2% by weight or more for increasing the maximum temperature or for decreasing the viscosity, and approximately 30% by weight or less for increasing the dielectric anisotropy. A more desirable ratio is in the range of approximately 4% by weight to approximately 25% by weight. An especially desirable ratio is in the range of approximately 4% by weight to approximately 20% by weight.

The additive is added to the composition for the purpose of adjusting to a device with a polymer sustained alignment type. A desirable ratio of the additive is approximately 0.03% by weight or more for orienting liquid crystal molecules, and approximately 10% by weight or less for preventing a poor display of a device. A more desirable ratio is in the range of approximately 0.1% by weight to approximately 2% by weight. An especially desirable ratio is in the range of approximately 0.2% by weight to approximately 1.0% by weight.

Fourth, a desirable embodiment of the component compounds will be explained. In formulas formula (1), formula (2), formula (3) and formula (4), $R^1$, $R^2$, $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine. Desirable $R^1$, $R^2$, $R^4$ or $R^5$ is alkyl having 1 to 12 carbons for increasing the stability to ultraviolet light or heat, and alkoxy having 1 to 12 carbons for increasing the dielectric anisotropy. $R^3$ is ethyl, vinyl or 1-propenyl. Desirable $R^3$ is vinyl for decreasing the viscosity. $R^6$ and $R^7$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine. Desirable $R^6$ or $R^7$ is alkenyl having 2 to 12 carbons for decreasing the viscosity, and alkyl having 1 to 12 carbons for increasing the stability to ultraviolet light or heat.

Desirable alkyl is methyl, ethyl, propyl, butyl, pentyl, hexyl, heptyl or octyl. More desirable alkyl is methyl, ethyl, propyl, butyl or pentyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity, for instance. Cis is preferable in the alkenyl such as 2-butenyl, 2-pentenyl and 2-hexenyl.

Desirable examples of alkyl in which at least one hydrogen has been replaced by fluorine or chlorine are fluoromethyl, 2-fluoroethyl, 3-fluoropropyl, 4-fluorobutyl, 5-fluoropentyl, 6-fluorohexyl, 7-fluoroheptyl or 8-fluorooctyl. More desirable examples are 2-fluoroethyl, 3-fluoropropyl, 4-fluorobutyl or 5-fluoropentyl for increasing the dielectric anisotropy.

Desirable examples of alkenyl in which at least one hydrogen has been replaced by fluorine or chlorine are 2,2-difluorovinyl, 3,3-difluoro-2-propenyl, 4,4-difluoro-3-butenyl, 5,5-difluoro-4-pentenyl or 6,6-difluoro-5-hexenyl. More desirable examples are 2,2-difluorovinyl or 4,4-difluoro-3-butenyl for decreasing the viscosity.

Ring A is tetrahydropyran-2,5-diyl. Ring B and ring C are independently 2-fluoro-1,4-phenylene or 2,3-difluoro-1,4-phenylene.

Ring D and ring F are independently 1,4-cyclohexylene, 1,4-cyclohexenylene, 1,4-phenylene, 1,4-phenylene in which at least one hydrogen has been replaced by fluorine or chlorine, naphthalene-2,6-diyl, naphthalene-2,6-diyl in which at least one hydrogen has been replaced by fluorine or chlorine, chromane-2,6-diyl or chromane-2,6-diyl in which at least one hydrogen has been replaced by fluorine or chlorine. Desirable ring D or ring F is 1,4-cyclohexylene for decreasing the viscosity, and 1,4-phenylene for increasing the optical anisotropy. Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochromane-2,6-diyl. Desirable ring E is 2,3-difluoro-1,4-phenylene for decreasing the viscosity, 2-chloro-3-fluoro-1,4-phenylene for decreasing the optical anisotropy, and 7,8-difluorochromane-2,6-diyl for increasing the dielectric anisotropy.

Ring G and ring I are independently 1,4-cyclohexylene, 1,4-phenylene, 2-fluoro-1,4-phenylene or 2,5-difluoro-1,4-phenylene. Desirable ring G or ring I is 1,4-cyclohexylene, for decreasing the viscosity or for increasing the maximum temperature, and 1,4-phenylene for decreasing the minimum temperature. With regard to the configuration of 1,4-cyclohexylene, trans is preferable to cis for increasing the maximum temperature.

$Z^1$, $Z^2$, $Z^3$, $Z^4$ and $Z^5$ are independently a single bond, ethylene, carbonyloxy or methyleneoxy. Desirable $Z^1$, $Z^2$, $Z^3$, $Z^4$ or $Z^5$ is a single bond for decreasing the viscosity, ethylene for decreasing the minimum temperature, and methyleneoxy for increasing the dielectric anisotropy. $Z^6$ is a single bond, ethylene or carbonyloxy. Desirable $Z^6$ is a single bond for increasing the stability to ultraviolet light or heat.

One of a and b is 0, and the other is 1. c is 1, 2 or 3, d is 0 or 1, and the sum of c and d is 3 or less. Desirable c is 1 for decreasing the viscosity, and is 2 or 3 for increasing the maximum temperature. Desirable d is 0 for decreasing the viscosity, and is 1 for decreasing the minimum temperature. e is 1, 2 or 3. Desirable e is 1 for decreasing the viscosity, and is 2 or 3 for increasing the maximum temperature.

In formula (5), $P^1$, $P^2$ and $P^3$ are independently a polymerizable group. Desirable $P^1$, $P^2$ or $P^3$ is a group selected from the group of polymerizable groups represented by formula (P-1) to formula (P-5). More desirable $P^1$, $P^2$ or $P^3$ is a group represented by formula (P-1), formula (P-2) or formula (P-3). Especially desirable $P^1$, $P^2$ or $P^3$ is a group represented by formula (P-1) or formula (P-2). The most desirable $P^1$, $P^2$ or $P^3$ is a group represented by formula (P-1). Desirable group represented by formula (P-1) is —OCO—CH=CH$_2$ or —OCO—C(CH$_3$)=CH$_2$. A wavy line in formula (P-1) to formula (P-5) shows a binding site.

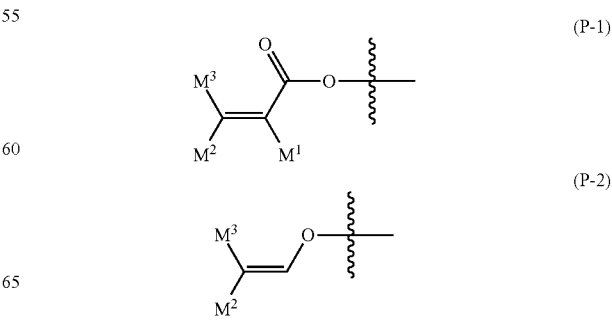

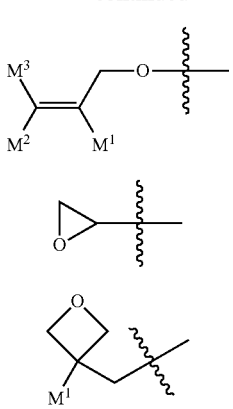

(P-3)

(P-4)

(P-5)

In formula (P-1) to formula (P-5), $M^1$, $M^2$ and $M^3$ are independently hydrogen, fluorine, alkyl having 1 to 5 carbons or alkyl having 1 to 5 carbons in which at least one hydrogen has been replaced by fluorine or chlorine. Desirable $M^1$, $M^2$ or $M^3$ is hydrogen or methyl for increasing the reactivity. More desirable $M^1$ is hydrogen or methyl, and more desirable $M^2$ or $M^3$ is hydrogen.

$Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO— and at least one —$CH_2$—$CH_2$— may be replaced by —CH=CH— or —C≡C—, and in these groups at least one hydrogen may be replaced by fluorine or chlorine. Desirable $Sp^1$, $Sp^2$ or $Sp^3$ is a single bond, —$CH_2$—$CH_2$—, —$CH_2$O—, —$OCH_2$—, —COO—, OCO—, —CO—CH=CH— or —CH=CH—CO—. More desirable $Sp^1$, $Sp^2$ or $Sp^3$ is a single bond.

Ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine. Desirable ring J or ring L is phenyl. Ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine. Desirable ring K is 1,4-phenylene or 2-fluoro-1,4-phenylene.

$Z^7$ and $Z^8$ are independently a single bond or alkylene having 1 to 10 carbons, and in the alkylene at least one —$CH_2$— may be replaced by —O—, —CO—, —COO— or —OCO— and at least one —$CH_2$—$CH_2$— may be replaced by —CH=CH—, —C($CH_3$)=CH—, —CH=C($CH_3$)— or —C($CH_3$)=C($CH_3$)—, and in these groups at least one hydrogen may be replaced by fluorine or chlorine. Desirable $Z^7$ or $Z^8$ is a single bond, —$CH_2$—$CH_2$—, —$CH_2$O—, —$OCH_2$—, —COO— or —OCO—. More desirable $Z^7$ or $Z^8$ is a single bond.

f is 0, 1 or 2. Desirable f is 0 or 1. g, h and i are independently 0, 1, 2, 3 or 4, and the sum of g, h, and i is 1 or more. Desirable g or i is 1 or 2, and desirable h is 0 or 1.

Fifth, desirable component compounds will be shown. Desirable compound (1) is compound (1-1) to compound (1-6) according to item 2. It is desirable that in these compounds, at least one of the first component should be compound (1-1), compound (1-2) or compound (1-3). It is desirable that at least two of the first component should be a combination of compound (1-1) and compound (1-3).

Desirable compound (3) is compound (3-1) to compound (3-20) according to item 5. It is desirable that in these compounds, at least one of the third component should be compound (3-1), compound (3-2), compound (3-3), compound (3-4), compound (3-6), compound (3-7), compound (3-8) or compound (3-10). It is desirable that at least two of the third component should be a combination of compound (3-1) and compound (3-6), compound (3-1) and compound (3-10), compound (3-3) and compound (3-6), compound (3-3) and compound (3-10), compound (3-4) and compound (3-6) or compound (3-4) and compound (3-10).

Desirable compound (4) is compound (4-1) to compound (4-12) according to item 8. It is desirable that in these compounds, at least one of the fourth component should be compound (4-2), compound (4-4), compound (4-5) or compound (4-6). It is desirable that at least two of the fourth component should be a combination of compound (4-2) and compound (4-4), compound (4-2) and compound (4-6).

Desirable compound (5) is compound (5-1) to compound (5-27) according to item 12. It is desirable that in these compounds, at least one of the additive should be compound (5-1), compound (5-2), compound (5-24), compound (5-25), compound (5-26) or compound (5-27). It is desirable that at least two of the additive should be a combination of compound (5-1) and compound (5-2), compound (5-1) and compound (5-18), compound (5-2) and compound (5-24), compound (5-2) and compound (5-25), compound (5-2) and compound (5-26), compound (5-25) and compound (5-26) or compound (5-18) and compound (5-24).

Sixth, additives that may be added to the composition will be explained. Such additives include an optically active compound, an antioxidant, an ultraviolet light absorber, a coloring matter, an antifoaming agent, a polymerizable compound, a polymerization initiator, a polymerization inhibitor and a polar compound. The optically active compound is added to the composition for the purpose of inducing the helical structure of liquid crystal molecules and giving a twist angle. Examples of such compounds include compound (5-1) to compound (5-5). A desirable ratio of the optically active compound is approximately 5% by weight or less, and a more desirable ratio is in the range of approximately 0.01% by weight to approximately 2% by weight.

(6-1)

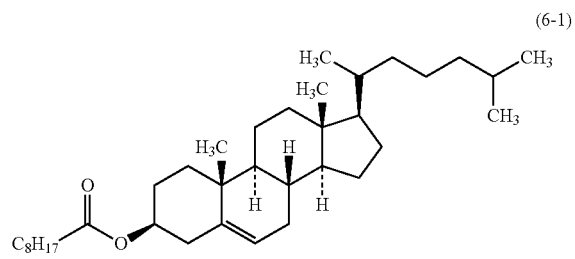

(6-2)
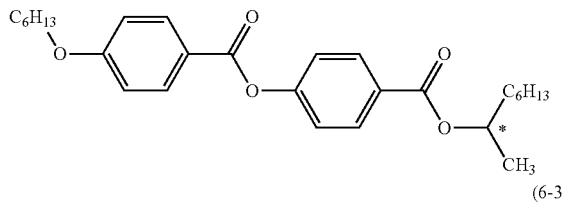

(6-3)
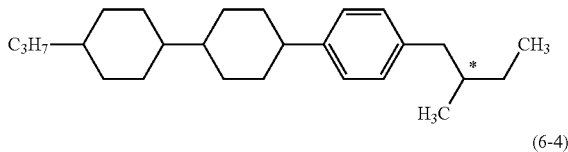

(6-4)
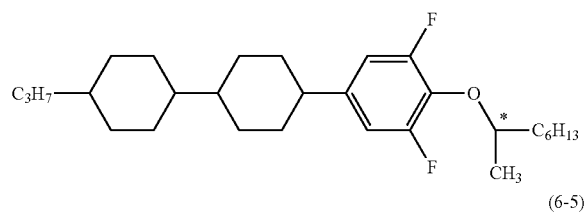

(6-5)
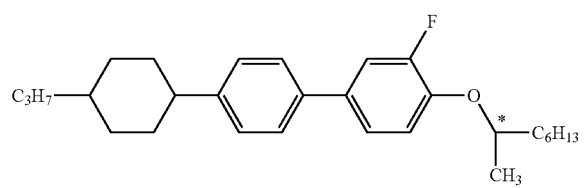

The antioxidant is added to the composition in order to prevent a decrease in specific resistance that is caused by heating under air, or to maintain a large voltage holding ratio at a temperature close to the maximum temperature as well as at room temperature, after the device has been used for a long time. A desirable example of the antioxidant is compound (7) where n is an integer from 1 to 9, for instance.

(7)
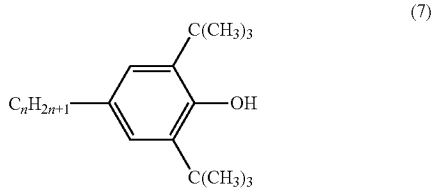

In compound (7), desirable n is 1, 3, 5, 7 or 9. More desirable n is 7. Compound (7) where n is 7 is effective in maintaining a large voltage holding ratio at a temperature close to the maximum temperature as well as at room temperature, after the device has been used for a long time, since it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of the ultraviolet light absorber include benzophenone derivatives, benzoate derivatives and triazole derivatives. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

A dichroic dye such as an azo dye or an anthraquinone dye is added to the composition for adjusting to a device having a guest host (GH) mode. A desirable ratio of the coloring matter is in the range of approximately 0.01% by weight to approximately 10% by weight. The antifoaming agent such as dimethyl silicone oil or methyl phenyl silicone oil is added to the composition for preventing foam formation. A desirable ratio of the antifoaming agent is approximately 1 ppm or more for achieving its effect and is approximately 1,000 ppm or less for preventing a poor display. A more desirable ratio is in the range of approximately 1 ppm to approximately 500 ppm.

The polymerizable compound is used for adjusting to a device with a polymer sustained alignment (PSA) type. Compound (5) is suitable for this purpose. A polymerizable compound that is different from compound (5) may be added to the composition in addition to compound (5). A polymerizable compound that is different from compound (5) may be added to the composition instead of compound (5). Desirable examples of such a polymerizable compound include compounds such as acrylates, methacrylates, vinyl compounds, vinyloxy compounds, propenyl ethers, epoxy compounds (oxiranes, oxetanes) and vinyl ketones. More desirable examples are acrylate derivatives or methacrylate derivatives. The reactivity of the polymerizable compound or the pretilt angle of liquid crystal molecules can be adjusted by changing the type of compound (5) or by combining compound (5) with a polymerizable compound that is different from compound (5) in a suitable ratio. A short response time of the device can be achieved by optimizing the pretilt angle. A large contrast ratio or a long service life can be achieved, since the alignment of liquid crystal molecules is stabilized.

The polymerizable compound is polymerized on irradiation with ultraviolet light. It may be polymerized in the presence of an initiator such as a photopolymerization initiator. Suitable conditions for polymerization, or a suitable type and amount of the initiator are known to a person skilled in the art, and are described in the literature. For example, Irgacure 651 (registered trademark; BASF), Irgacure 184 (registered trademark; BASF) or Darocur 1173 (registered trademark; BASF), each of which is a photoinitiator, is suitable for radical polymerization. A desirable ratio of the photopolymerization initiator is in the range of approximately 0.1% by weight to approximately 5% by weight based on the weight of the polymerizable compound. A more desirable ratio is in the range of approximately 1% by weight to approximately 3% by weight.

The polymerization inhibitor may be added in order to prevent the polymerization when the polymerizable compound is kept in storage. The polymerizable compound is usually added to the composition without removing the polymerization inhibitor. Examples of the polymerization inhibitor include hydroquinone derivatives such as hydroquinone and methylhydroquinone, 4-t-butylcatechol, 4-methoxyphenol and phenothiazine.

A polar compound is an organic compound having polarity. It does not include a compound with ionic bonds. Atoms, such as oxygen, sulfur and nitrogen, that are more electronegative have a tendency to have partial negative charges. Atoms, such as carbon and hydrogen, have a tendency to be neutral or have partial positive charges. Polarity results from the uneven partial charge distribution between various atoms in the compound. For example, the polar compound has at least one of partial structures such as —OH, —COOH, —SH, —NH$_2$, >NH and >N—.

Seventh, methods for synthesizing the component compounds will be explained. These compounds can be synthesized by known methods. The synthetic methods will be exemplified. The synthetic method of compound (1) will be described in Examples. Compound (2) is prepared by the method described in JP S59-176221 A (1984). Compound (3-6) is prepared by the method described in JP 2000-53602 A (2000). Compound (4-2) is prepared by the method described in JP S52-53783 A (1977). Compound (5-18) is prepared by the method described in JP H07-101900 A (1995). An antioxidant is commercially available. A compound of formula (7) where n is 1 is available from Sigma-Aldrich Corporation. Compound (7) where n is 7, for instance, is synthesized according to the method described in U.S. Pat. No. 3,660,505.

Compounds whose synthetic methods are not described can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press), and "Shin-Jikken Kagaku Kouza" (New experimental Chemistry Course, in English; Maruzen Co., Ltd., Japan). The composition is prepared according to known methods using the compounds thus obtained. For example, the component compounds are mixed and dissolved in each other by heating.

Last, the use of the composition will be explained. Most compositions have a minimum temperature of approximately −10° C. or lower, a maximum temperature of approximately 70° C. or higher, and an optical anisotropy in the range of approximately 0.07 to approximately 0.20. A composition having an optical anisotropy in the range of approximately 0.08 to approximately 0.25 may be prepared by adjusting the ratio of the component compounds or by mixing with any other liquid crystal compound. Furthermore, a composition having an optical anisotropy in the range of approximately 0.10 to approximately 0.30 may be prepared by trial and error. A device including this composition has a large voltage holding ratio. This composition is suitable for an AM device. This composition is suitable especially for an AM device having a transmission type. This composition can be used as a composition having a nematic phase or as an optically active composition by adding an optically active compound.

The composition can be used for an AM device. It can also be used for a PM device. The composition can also be used for the AM device and the PM device having a mode such as PC, TN, STN, ECB, OCB, IPS, FFS, VA or FPA. It is especially desirable to use the composition for the AM device having a mode of TN, OCB, IPS or FFS. In the AM device having the IPS or FFS mode, the alignment of liquid crystal molecules may be parallel or perpendicular to the glass substrate, when no voltage is applied. These devices may be of a reflection type, a transmission type or a semi-transmission type. It is desirable to use the composition for a device having the transmission type. The composition can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a three-dimensional network-polymer is formed in the composition.

One example of methods for producing a device with a polymer sustained alignment type is as follows: A device having two substrates, called an array substrate and a color filter substrate, is assembled. The substrates have an alignment film. At least one of the substrates has an electrode layer. Liquid crystal compounds are mixed to give a liquid crystal composition. A polymerizable compound is added to this composition. An additive may be further added as required. The composition is poured into the device. The device is irradiated with light while a voltage is applied to it. Ultraviolet light is desirable. The polymerizable compound is polymerized by irradiation with light. A composition including a polymer is formed by the polymerization. The device with a polymer sustained alignment type can be produced by this procedure.

In the procedure, liquid crystal molecules are aligned by the effect of the alignment film and an electric field when a voltage is applied. The molecules of the polymerizable compound are also aligned according to the alignment. A polymer where the alignment is maintained is formed, since the polymerizable compound is polymerized by ultraviolet light under these conditions. The response time of the device is decreased by the effect of the polymer. Image burn-in can also be improved at the same time by the effect of the polymer, since the burn-in is a malfunction of liquid crystal molecules. Incidentally, it may be possible that the polymerizable compound in the composition is polymerized in advance and then this composition is placed between the substrates of a liquid crystal display device.

EXAMPLES

The invention will be explained in more detail by way of examples. The invention is not limited to the examples. The invention includes a mixture of the composition in Example 1 and the composition in Example 2. The invention also includes a mixture prepared by mixing at least two compositions in Examples. Compounds prepared herein were identified by methods such as NMR analysis. The characteristics of the compounds, compositions and devices were measured by the methods described below.

NMR Analysis: A model DRX-500 apparatus made by Bruker BioSpin Corporation was used for measurement. In the measurement of $^1$H-NMR, a sample was dissolved in a deuterated solvent such as CDCl$_3$, and the measurement was carried out under the conditions of room temperature, 500 MHz and the accumulation of 16 scans. Tetramethylsilane was used as an internal standard. In the measurement of $^{19}$F-NMR, CFCl$_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

Gas Chromatographic Analysis: A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometers, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometers), Rtx-1 made by Restek Corporation (length 30 meters, bore 0.32 millimeter, film thickness 0.25 micrometers), and BP-1 made by SGE International Pty. Ltd. (length 30 meters, bore 0.32 millimeter, film thickness 0.25 micrometers). A capillary column CBP1-M50-025 (length 50 meters, bore 0.25 millimeter, film thickness 0.25 micrometers) made by Shimadzu Corporation may also be used for the purpose of avoiding an overlap of peaks of the compounds.

The ratio of the liquid crystal compounds included in the composition may be calculated according to the following method. A mixture of the liquid crystal compounds was analyzed by gas chromatography (FID). The ratio of peak areas in the gas chromatogram corresponds to the ratio (ratio by weight) of the liquid crystal compounds. When the capillary columns described above are used, the correction coefficient of respective liquid crystal compounds may be regarded as 1 (one). Accordingly, the ratio (percentage by weight) of the liquid crystal compounds can be calculated from the ratio of peak areas.

Samples for measurement: A composition itself was used as a sample when the characteristics of the composition or the device were measured. When the characteristics of a compound were measured, a sample for measurement was prepared by mixing this compound (15% by weight) with mother liquid crystals (85% by weight). The characteristic values of the compound were calculated from the values obtained from measurements by an extrapolation method: (Extrapolated value)=(Measured value of sample)−0.85× (Measured value of mother liquid crystals)/0.15. When a smectic phase (or crystals) deposited at 25° C. at this ratio, the ratio of the compound to the mother liquid crystals was changed in the order of (10% by weight: 90% by weight), (5% by weight: 95% by weight) and (1% by weight: 99% by weight). The values of the maximum temperature, the optical anisotropy, the viscosity and the dielectric anisotropy regarding the compound were obtained by means of this extrapolation method.

The mother liquid crystals described below were used. The ratio of the component compounds were expressed as a percentage by weight.

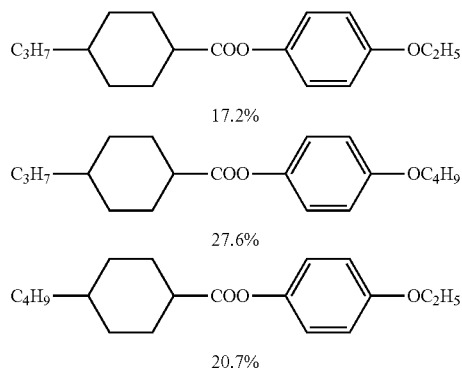

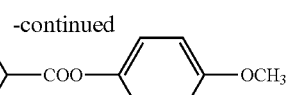

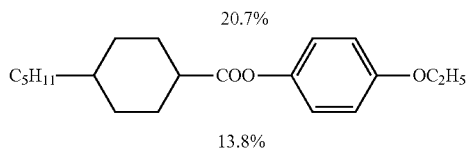

Measurement methods: The characteristics of compounds were measured according to the following methods. Most are methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement.

(1) Maximum Temperature of a Nematic Phase (NI; ° C.): A sample was placed on a hot plate in a melting point apparatus equipped with a polarizing microscope and was heated at the rate of 1° C. per minute. The temperature was measured when a part of the sample began to change from a nematic phase to an isotropic liquid. The upper limit of the temperature range of a nematic phase is sometimes abbreviated to the "maximum temperature."

(2) Minimum Temperature of a Nematic Phase (Tc; ° C.): A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as <−20° C. A lower limit of the temperature range of a nematic phase is sometimes abbreviated to "the minimum temperature."

(3) Viscosity (bulk viscosity; q; measured at 20° C.; mPa·s): An E-type viscometer made by Tokyo Keiki Inc. was used for measurement.

(4) Viscosity (rotational viscosity; yl; measured at 25° C.; mPa·s): The measurement was carried out according to the method described in M. Imai, et al., Molecular Crystals and Liquid Crystals, Vol. 259, p. 37 (1995). A sample was poured into a VA device in which the distance between the two glass substrates (cell gap) was 20 micrometers. A voltage in the range of 39 V to 50 V was applied stepwise with an increment of 1 volt to this device. After a period of 0.2 seconds with no voltage, a voltage was applied repeatedly under the conditions of only one rectangular wave (rectangular pulse; 0.2 seconds) and no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of the dielectric anisotropy necessary for the present calculation was measured according to measurement (6).

(5) Optical anisotropy (refractive index anisotropy; An; measured at 25° C.): The measurement was carried out using an Abbe refractometer with a polarizing plate attached to the ocular, using light at a wavelength of 589 nanometers. The surface of the main prism was rubbed in one direction, and then a sample was placed on the main prism. The refractive index (n∥) was measured when the direction of the polarized light was parallel to that of rubbing. The refractive index (n⊥) was measured when the direction of polarized light was perpendicular to that of rubbing. The value of the optical anisotropy (Δn) was calculated from the equation: Δn=n∥−n⊥.

(6) Dielectric anisotropy (ΔE; measured at 25° C.): The value of dielectric anisotropy was calculated from the equation: Δ∈=∈∥−∈⊥. The dielectric constants (∈∥ and ∈⊥) were measured as follows.

1) Measurement of a dielectric constant (∈∥): A solution of octadecyltriethoxysilane (0.16 mL) in ethanol (20 mL) was applied to thoroughly cleaned glass substrates. The glass substrates were rotated with a spinner, and then heated at 150° C. for one hour. A sample was poured into a VA device in which the distance between the two glass substrates (cell gap) was 4 micrometers, and then this device was sealed with a UV-curable adhesive. Sine waves (0.5 V, 1 kHz) were applied to this device, and the dielectric constant (∈∥) in the major axis direction of liquid crystal molecules was measured after 2 seconds.

2) Measurement of a dielectric constant (∈⊥): A polyimide solution was applied to thoroughly cleaned glass substrates. The glass substrates were calcined, and then the resulting alignment film was subjected to rubbing. A sample was poured into a TN device in which the distance between the two glass substrates (cell gap) was 9 micrometers and the twist angle was 80 degrees. Sine waves (0.5 V, 1 kHz) were applied to this device, and the dielectric constant (∈⊥) in the minor axis direction of liquid crystal molecules was measured after 2 seconds.

(7) Threshold voltage (Vth; measured at 25° C.; V): An LCD evaluation system Model LCD-5100 made by Otsuka Electronics Co., Ltd. was used for measurement. The light source was a halogen lamp. A sample was poured into a VA device having a normally black mode, in which the distance between the two glass substrates (cell gap) was 4 micrometers and the rubbing direction was antiparallel, and then this device was sealed with a UV-curable adhesive. The voltage to be applied to this device (60 Hz, rectangular waves) was stepwise increased in 0.02 V increments from 0 V up to 20 V. During the increase, the device was vertically irradiated with light, and the amount of light passing through the device was measured. A voltage-transmittance curve was prepared, in which the maximum amount of light corresponded to 100% transmittance and the minimum amount of light corresponded to 0% transmittance. The threshold voltage was expressed as voltage at 10% transmittance.

(8) Voltage Holding Ratio (VHR-1; measured at 25° C.; %): A TN device used for measurement had a polyimide-alignment film, and the distance between the two glass substrates (cell gap) was 5 micrometers. A sample was poured into the device, and then this device was sealed with a UV-curable adhesive. A pulse voltage (60 microseconds at 5 V) was applied to this device and the device was charged. A decreasing voltage was measured for 16.7 milliseconds with a high-speed voltmeter, and area A between the voltage curve and the horizontal axis in a unit cycle was obtained. Area B was an area without the decrease. The voltage holding ratio was expressed as a percentage of area A to area B.

(9) Voltage Holding Ratio (VHR-2; measured at 80° C.; %): The voltage holding ratio was measured by the method described above, except that it was measured at 80° C. instead of 25° C. The resulting values were represented by the symbol VHR-2.

(10) Voltage Holding Ratio (VHR-3; measured at 25° C.; %): The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra-high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

(11) Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

(12) Response Time (τ; measured at 25° C.; millisecond): An LCD evaluation system Model LCD-5100 made by Otsuka Electronics Co., Ltd. was used for measurement. The light source was a halogen lamp. The low-pass filter was set at 5 kHz. A sample was poured into a VA device having a normally black mode, in which the distance between the two glass substrates (cell gap) was 4 micrometers and the rubbing direction was antiparallel. This device was sealed with a UV-curable adhesive. Rectangular waves (60 Hz, 10 V, 0.5 second) were applied to this device. The device was vertically irradiated with light simultaneously, and the amount of light passing through the device was measured. The transmittance was regarded as 100% when the amount of light reached a maximum. The transmittance was regarded as 0% when the amount of light reached a minimum. The response time was expressed as the period of time required for the change from 90% to 10% transmittance (fall time: millisecond).

(13) Specific Resistance (ρ; measured at 25° C.; Ω cm): A sample of 1.0 milliliter was poured into a vessel equipped with electrodes. A DC voltage (10 V) was applied to the vessel, and the DC current was measured after 10 seconds. The specific resistance was calculated from the following equation. (specific resistance)=[(voltage)×(electric capacity of vessel)]/[(DC current)×(dielectric constant in vacuum)].

Compound (1-4) was prepared by the method described below. Incidentally, Solmix A-11 was a mixture of ethanol (85.51), methanol (13.4%) and 2-propanol (1.1%), and was available from Japan Alcohol Trading Co., Ltd.

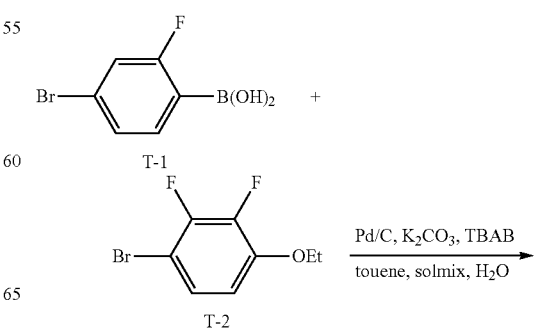

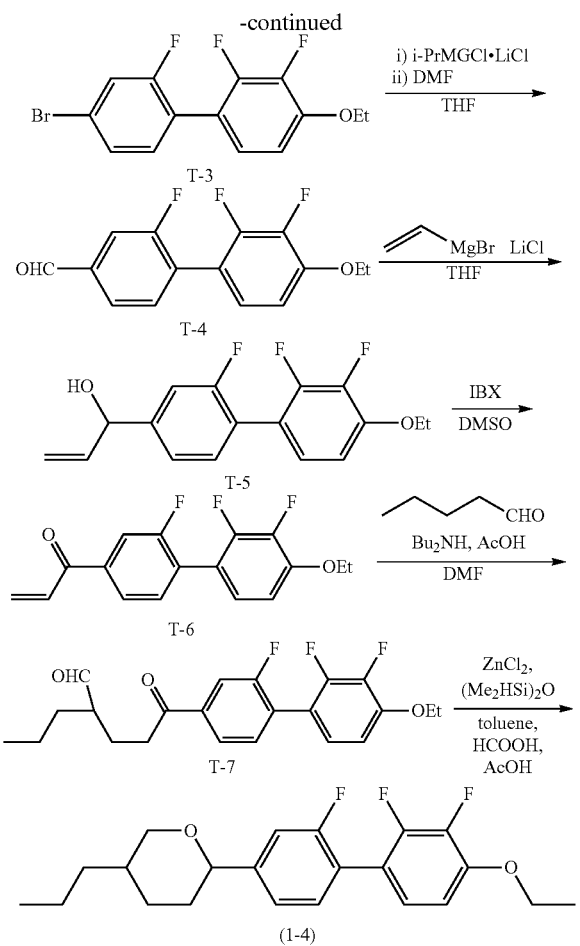

First Step:

Compound (T-1) was prepared by known methods. A mixture of compound (T-1) (4.89 g, 22.3 mmol), compound (T-2) (4.81 g, 20.3 mmol), potassium carbonate (5.61 g, 40.6 mmol), tetrabutylammonium bromide (1.31 g, 4.06 mmol), palladium-carbon (0.179 g), toluene (20 ml), solmix (20 ml) and water (20 ml) was refluxed for 5 hours. The reaction mixture was cooled to room temperature and palladium-carbon was filtered off. The usual workup and purification by silica gel chromatography gave compound (T-3) (6.72 g, 20.3 mmol; 99%).

Second Step:

Compound (T-3) (6.72 g, 20.3 mmol) in THF (50 ml) solution was cooled to −70° C., and i-PrMgCl.LiCl in THF solution (1.3 M; 17.17 ml, 22.3 mmol) was added dropwise. After 2.5 hours of stirring at −70° C., N,N-dimethylformamide (2.04 ml, 26.4 mmol) in THF (10 ml) solution was added dropwise. After 1 hour of stirring at −70° C., the reaction mixture was returned to room temperature, and poured into an aqueous solution of sodium thiosulfate. The usual workup and purification by silica gel chromatography gave compound (T-4) (4.55 g, 16.2 mmol; 80%.

Third Step:

Vinylmagnesium bromide in THF solution (1.31 M; 13.3 ml, 17.0 mmol) was added dropwise to lithium chloride (0.722 g, 17.0 mmol) in THF (45 ml), and the mixture was stirred at room temperature for 1 hour. The reaction mixture was cooled to 0° C., and compound (T-4) (4.55 g, 16.2 mmol) in THF (15 ml) solution was added dropwise. The reaction mixture was returned to room temperature, stirred for 8 hours, and poured into 1M-hydrochloric acid. The usual workup and purification by silica gel chromatography gave compound (T-5) (5.00 g, 16.2 mmol; quantitative).

Fourth Step:

Compound (T-5) (5.00 g, 16.2 mmol) in DMSO (15 ml) solution was added dropwise to 2-iodoxybenzoic acid (63%; 9.02 g, 20.3 mmol) in DMSO (40 ml) solution, and the mixture was stirred at room temperature for 3 hours. Water and toluene were added to the reaction mixture, the residue was filtered off, and an aqueous solution of sodium sulfite was added to the filtrate. The usual workup and purification by silica gel chromatography gave compound (T-6) (4.97 g, 16.2 mmol; quantitative).

Fifth Step:

Dibutylamine (3.31 ml, 19.5 mmol) in DMF (10 ml) solution was added dropwise to valeraldehyde (1.75 ml, 16.2 mmol) in DMF (40 ml) solution, and the mixture was refluxed for 10 hours. The reaction mixture was cooled to room temperature and the usual work-up was carried out. The crude product was dissolved in DMF (50 ml), compound (T-6) (4.97 g, 16.2 mmol) in DMF (15 ml) solution was added. The mixture was heated at 50° C., and stirred for 10 hours. The reaction mixture was cooled to room temperature and acetic acid was added. The usual workup and purification by silica gel chromatography gave compound (T-7) (5.35 g, 13.6 mmol; 84%).

Sixth Step:

Zinc chloride (1.86 g, 13.6 mmol) and 1,1,3,3-tetramethyldisiloxane (11.5 ml, 75.0 mmol) were added to a mixture of compound (T-7) (5.35 g, 13.6 mmol), toluene (20 ml), formic acid (15 ml) and acetic acid (15 ml), and the mixture was stirred at room temperature for 10 hours. The reaction mixture was poured into water, and the usual workup and purification by silica gel chromatography gave compound (1-4) (2.84 g, 7.50 mmol; 55%).

1H-NMR (CDCl$_3$; δ ppm): 7.03 (1H, t, J=7.6 Hz), 7.18 (2H, d, J=9.4 Hz), 7.02 (1H, ddd, J=2.2 Hz, 8.1 Hz, 8.1 Hz), 6.79 (1H, ddd, J=1.8 Hz, 8.0 Hz, 8.1 Hz), 4.30 (1H, dd, J=2.1, 11.4 Hz), 4.16 (2H, q, J=7.1 Hz), 4.12-4.08 (1H, m), 3.22 (1H, t, J=11.2 Hz), 2.03-1.99 (1H, m), 1.94-1.89 (1H, m), 1.73-1.65 (1H, m), 1.64-1.56 (1H, m), 1.48 (3H, t, J=7.0 Hz), 1.41-1.24 (3H, m), 1.22-1.09 (2H, m), 0.92 (3H, t, J=7.2 Hz).

Examples of compositions will be shown below. Component compounds were expressed in terms of symbols according to the definition in Table 3 described below. In Table 3, the configuration of 1,4-cyclohexylene is trans. The parenthesized number next to a symbolized compound represents the chemical formula to which the compound belongs. The symbol (—) means any other liquid crystal compound. The ratio (percentage) of a liquid crystal compound means the percentages by weight (% by weight) based on the weight of the liquid, crystal composition excluding additives. Last, the values of characteristics of the composition are summarized.

TABLE 3

| Method of Description of Compounds using Symbols R—(A$_1$)—Z$_1$— . . . —Z$_n$—(A$_n$)—R' | |
|---|---|
|  | Symbol |
| 1) Left-terminal Group R— | |
| F—C$_n$H$_{2n}$— | Fn— |
| C$_n$H$_{2n+1}$— | n- |
| C$_n$H$_{2n+1}$O— | nO— |
| C$_m$H$_{2m+1}$OC$_n$H$_{2n}$— | mOn— |

TABLE 3-continued

Method of Description of Compounds using Symbols
R—(A₁)—Z₁—...—Zₙ—(Aₙ)—R'

| | Symbol |
|---|---|
| CH₂=CH— | V— |
| CₙH₂ₙ₊₁—CH=CH— | nV— |
| CH₂=CH—CₙH₂ₙ— | Vn— |
| CₘH₂ₘ₊₁—CH=CH—CₙH₂ₙ— | mVn— |
| CF₂=CH— | VFF— |
| CF₂=CH—CₙH₂ₙ— | VFFn— |
| CH₂=CH—COO— | AC— |
| CH₂=C(CH₃)—COO— | MAC— |
| 2) Right-terminal Group —R' | |
| —CₙH₂ₙ₊₁ | -n |
| —OCₙH₂ₙ₊₁ | —On |
| —CH=CH₂ | —V |
| —CH=CH—CₙH₂ₙ₊₁ | —Vn |
| —CₙH₂ₙ—CH=CH₂ | —nV |
| —CₘH₂ₘ—CH=CH—CₙH₂ₙ₊₁ | —mVn |
| —CH=CF₂ | —VFF |
| —OCO—CH=CH₂ | —AC |
| —OCO—C(CH₃)=CH₂ | —MAC |
| 3) Bonding Group —Zₙ— | |
| —CₙH₂ₙ— | n |
| —COO— | E |
| —CH=CH— | V |
| —CH=CHO— | VO |
| —OCH=CH— | OV |
| —CH₂O— | 1O |
| —OCH₂— | O1 |
| 4) Ring —Aₙ— | |
|  | H |
|  | B |
| 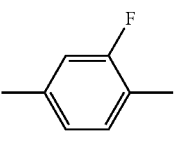 | B(F) |
| 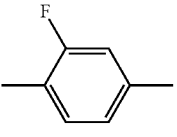 | B(2F) |
| 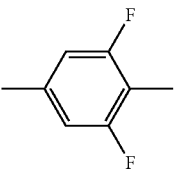 | B(F,F) |
| 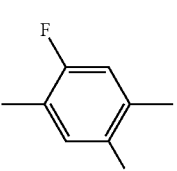 | B(2F,5F) |

TABLE 3-continued

Method of Description of Compounds using Symbols
R—(A₁)—Z₁—...—Zₙ—(Aₙ)—R'

| | Symbol |
|---|---|
| 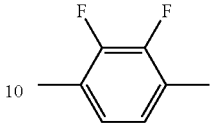 | B(2F,3F) |
| 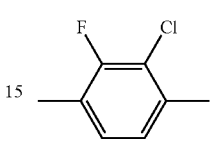 | B(2F,3Cl) |
| 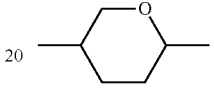 | dh |
| 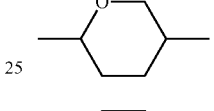 | Dh |
| 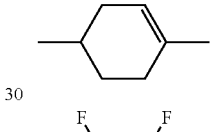 | ch |
| 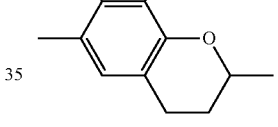 | Cro(7F,8F) |
| 5) Examples of Description | |

Example 1. 3-dhB(F)B(2F,3F)-O2

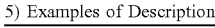

Example 2. 3-HH-V

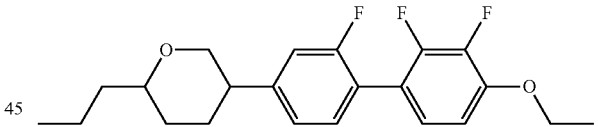

Example 3. V-HHB-1

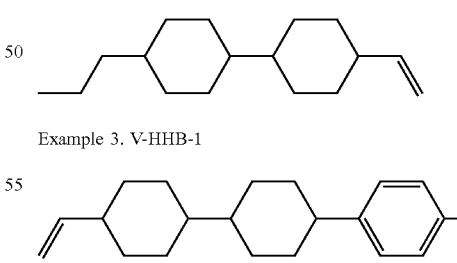

Example 4. 3-HHB(2F,3F)-O2

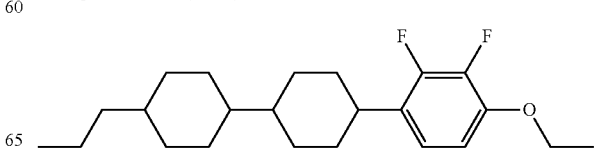

Comparative Example 1

Example 10 was selected from the composition disclosed in JP 2001-115161 A. The basis is that this composition contained compound (1-3) that is the first component.

| | | |
|---|---|---|
| 5-DhB(2F,3F)-O1 | (—) | 5% |
| 3-HDhB(2F,3F)-1 | (—) | 5% |
| 3-HDhB(2F,3F)-3 | (—) | 5% |
| 3-HDhB(2F,3F)-O1 | (—) | 10% |
| 5-HDhB(2F,3F)-O1 | (—) | 11% |
| 3-HDhB(2F,3F)-O2 | (—) | 11% |
| 5-HDhB(2F,3F)-O2 | (—) | 11% |
| 5-BDhB(2F,3F)-O1 | (—) | 5% |
| 5-BDhB(2F,3F)-O2 | (—) | 3% |
| 3-DhB(2F,3F)B(2F,3F)-O2 | (1-3) | 3% |
| 3-HH-4 | (—) | 5% |
| 3-HB-O2 | (4-1) | 4% |
| 3-HH-EMe | (—) | 4% |
| 3-HHB-1 | (4-4) | 3% |
| 3-HHB-O1 | (4-4) | 4% |
| 4-HEB-O2 | (4) | 5% |
| 5-HEB-O2 | (4) | 6% |

NI = 94.7° C.; Tc < −20° C.; η = 43.8 mPa · s; Δn = 0.094; Δε = −3.8.

Example 1

| | | |
|---|---|---|
| 3-DhB(F)B(2F,3F)-O2 | (1-1) | 6% |
| 3-DhB(2F,3F)B(2F,3F)-O2 | (1-3) | 7% |
| 3-HH-V | (2) | 29% |
| V-HB(2F,3F)-O2 | (3-1) | 7% |
| 3-BB(2F,3F)-O2 | (3-4) | 7% |
| V2-BB(2F,3F)-O2 | (3-4) | 7% |
| 2-HHB(2F,3F)-O2 | (3-6) | 3% |
| 3-HHB(2F,3F)-O2 | (3-6) | 8% |
| V-HHB(2F,3F)-O2 | (3-6) | 10% |
| V-HHB(2F,3F)-O4 | (3-6) | 5% |
| 3-HBB(2F,3F)-O2 | (3-10) | 7% |
| V-HHB-1 | (4-4) | 4% |

NI = 75.2° C.; Tc < −20° C.; η = 20.0 mPa · s; Δn = 0.106; Δε = −4.4.

Example 2

| | | |
|---|---|---|
| 3-dhB(F)B(2F,3F)-O2 | (1-4) | 5% |
| 3-dhB(2F,3F)B(2F,3F)-O2 | (1-6) | 5% |
| 3-HH-V | (2) | 30% |
| 3-H2B(2F,3F)-O2 | (3-2) | 7% |
| 3-BB(2F,3F)-O2 | (3-4) | 4% |
| 5-BB(2F,3F)-O2 | (3-4) | 3% |
| 3-HHB(2F,3F)-O2 | (3-6) | 5% |
| V-HHB(2F,3F)-O2 | (3-6) | 5% |
| 3-HH2B(2F,3F)-O2 | (3-7) | 3% |
| 5-HH2B(2F,3F)-O2 | (3-7) | 4% |
| V-HH1OB(2F,3F)-O2 | (3-8) | 3% |
| 2-HBB(2F,3F)-O2 | (3-10) | 5% |
| 3-HHB(2F,3Cl)-O2 | (3-12) | 2% |
| 5-HHB(2F,3Cl)-O2 | (3-12) | 3% |
| 3-HchB(2F,3F)-O2 | (3-17) | 2% |
| 3-BB(2F)B(2F,3F)-O2 | (3-18) | 4% |
| 3-BB(F)B(2F,3F)-O2 | (3-19) | 2% |
| 5-HB-O2 | (4-1) | 2% |
| V2-BB-1 | (4-2) | 2% |
| 3-HBB-2 | (4-5) | 4% |

NI = 82.9° C.; Tc < −20° C.; η = 16.3 mPa · s; Δn = 0.111; Δε = −3.7.

Example 3

| | | |
|---|---|---|
| 3-DhB(F)B(2F,3F)-O2 | (1-1) | 5% |
| 3-dhB(F)B(2F,3F)-O2 | (1-4) | 5% |
| 3-HH-V | (2) | 30% |
| 3-HH-V1 | (2) | 5% |
| V-HB(2F,3F)-O2 | (3-1) | 5% |
| 3-H1OB(2F,3F)-O2 | (3-3) | 3% |
| 3-B(2F,3F)B(2F,3F)-O2 | (3-5) | 3% |
| 3-HHB(2F,3F)-O2 | (3-6) | 9% |
| 4-HHB(2F,3F)-O2 | (3-6) | 4% |
| 3-HH1OB(2F,3F)-O2 | (3-8) | 4% |
| 2-BB(2F,3F)B-3 | (3-9) | 3% |
| 3-HBB(2F,3Cl)-O2 | (3-13) | 2% |
| 5-HBB(2F,3Cl)-O2 | (3-13) | 3% |
| 3-HH1OCro(7F,8F)-5 | (3-15) | 4% |
| 3-B(2F)B(2F,3F)-O2 | (3-20) | 2% |
| V2-HHB-1 | (4-4) | 2% |
| 1-BB(F)B-2V | (4-6) | 3% |
| V2-BB2B-1 | (4-8) | 3% |
| 3-HH-VFF | (—) | 5% |

NI = 76.6° C.; Tc < −20° C.; η = 15.4 mPa · s; Δn = 0.102; Δε = −3.4.

Example 4

| | | |
|---|---|---|
| 3-DhB(2F)B(2F,3F)-O2 | (1-2) | 7% |
| 3-dhB(2F,3F)B(2F,3F)-O4 | (1-6) | 5% |
| 3-HH-V | (2) | 25% |
| 3-HH-2 | (2) | 10% |
| 3-HB(2F,3F)-O2 | (3-1) | 5% |
| 5-HB(2F,3F)-O2 | (3-1) | 5% |
| 2-HHB(2F,3F)-O2 | (3-6) | 3% |
| 3-HHB(2F,3F)-O2 | (3-6) | 5% |
| 2-HBB(2F,3F)-O2 | (3-10) | 3% |
| 3-HBB(2F,3F)-O2 | (3-10) | 8% |
| 3-HEB(2F,3F)B(2F,3F)-O2 | (3-11) | 3% |
| 3-H1OCro(7F,8F)-5 | (3-14) | 3% |
| 3-chB(2F,3F)-O2 | (3-16) | 3% |
| V-chB(2F,3F)-O2 | (3-16) | 3% |
| 3-HHEH-3 | (4-3) | 3% |
| 5-B(F)BB-3 | (4-7) | 3% |
| 5-HB(F)BH-3 | (4-11) | 3% |
| 1O1-HBBH-5 | (—) | 3% |

NI = 80.1° C.; Tc < −20° C.; η = 19.0 mPa · s; Δn = 0.102; Δε = −3.5.

Example 5

| | | |
|---|---|---|
| 3-DhB(F)B(2F,3F)-O2 | (1-1) | 5% |
| 3-dhB(2F)B(2F,3F)-O2 | (1-5) | 5% |
| 3-HH-V | (2) | 20% |
| 3-HH-V1 | (2) | 5% |
| 3-HH-2 | (2) | 5% |
| 3-HB(2F,3F)-O2 | (3-1) | 5% |
| 3-BB(2F,3F)-O2 | (3-4) | 3% |
| 5-BB(2F,3F)-O2 | (3-4) | 3% |
| 2-HHB(2F,3F)-O2 | (3-6) | 5% |
| 3-HHB(2F,3F)-O2 | (3-6) | 12% |
| V-HHB(2F,3F)-O2 | (3-6) | 3% |
| V-HH1OB(2F,3F)-O2 | (3-8) | 3% |
| 2-HBB(2F,3F)-O2 | (3-10) | 5% |
| 3-HBB(2F,3F)-O2 | (3-10) | 8% |
| 1-BB-3 | (4-2) | 4% |
| 1-BB-5 | (4-2) | 3% |
| 3-HHB-1 | (4-4) | 3% |
| 3-HHEBH-3 | (4-10) | 3% |

NI = 87.7° C.; Tc < −20° C.; η = 15.1 mPa · s; Δn = 0.110; Δε = −3.6.

Example 6

| | | |
|---|---|---|
| 3-DhB(2F)B(2F,3F)-O2 | (1-2) | 7% |
| 4-DhB(2F,3F)B(2F,3F)-O2 | (1-3) | 5% |
| 3-HH-V | (2) | 28% |
| 3-HH-V1 | (2) | 5% |
| 3-HH-2 | (2) | 5% |
| 3-HB(2F,3F)-O2 | (3-1) | 5% |
| 3-BB(2F,3F)-O2 | (3-4) | 5% |
| 2-HHB(2F,3F)-O2 | (3-6) | 5% |
| 3-HHB(2F,3F)-O2 | (3-6) | 7% |
| 2-HBB(2F,3F)-O2 | (3-10) | 5% |
| 3-HBB(2F,3F)-O2 | (3-10) | 10% |
| 5-BB(2F)B(2F,3F)-O2 | (3-18) | 2% |
| 3-BB(F)B(2F,3F)-O2 | (3-19) | 2% |
| 3-HB-O2 | (4-1) | 3% |
| 3-HB(F)HH-2 | (4-9) | 3% |
| 3-HBB(F)B-2 | (4-12) | 3% |

NI = 85.8° C.; Tc < −20° C.; η = 17.8 mPa · s, Δn = 0.111; Δε = −3.5.

Example 7

| | | |
|---|---|---|
| 3-DhB(F)B(2F,3F)-O2 | (1-1) | 4% |
| 4-DhB (F) B (2F,3F)-O2 | (1-1) | 4% |
| 3-dhB(2F)B(2F,3F)-O2 | (1-5) | 7% |
| 3-HH-V | (2) | 25% |
| 3-HH-2 | (2) | 8% |
| V-HB(2F,3F)-O2 | (3-1) | 3% |
| 5-HB(2F,3F)-O2 | (3-1) | 5% |
| 5-H2B(2F,3F)-O2 | (3-2) | 3% |
| 2-H1OB(2F,3F)-O2 | (3-3) | 3% |
| 3-HHB(2F,3F)-O2 | (3-6) | 10% |
| 4-HHB(2F,3F)-O2 | (3-6) | 2% |
| 2-HH1OB(2F,3F)-O2 | (3-8) | 3% |
| 3-HBB(2F,3F)-O2 | (3-10) | 6% |
| 3-HH1OCro(7F,8F)-5 | (3-15) | 3% |
| 3-HchB(2F,3F)-O2 | (3-17) | 3% |
| V-HBB-3 | (4-5) | 5% |
| 2-BB(F)B-2V | (4-6) | 3% |
| 3-BB(F)B-2V | (4-6) | 3% |

NI = 81.4° C.; Tc < −20° C.; η = 18.4 mPa · s; Δn = 0.107; Δε = −3.7.

Example 8

| | | |
|---|---|---|
| 3-dhB (F) B (2F,3F)-O2 | (1-4) | 5% |
| 3-dhB(2F,3F)B(2F,3F)-O2 | (1-6) | 5% |
| 3-HH-V | (2) | 30% |
| V-HB(2F,3F)-O2 | (3-1) | 5% |
| 3-HB(2F,3F)-O2 | (3-1) | 8% |
| 3-HHB(2F,3F)-O2 | (3-6) | 8% |
| 4-HHB(2F,3F)-O2 | (3-6) | 3% |
| V-HHB(2F,3F)-O2 | (3-6) | 3% |
| 3-HBB(2F,3F)-O2 | (3-10) | 5% |
| 5-HBB(2F,3F)-O2 | (3-10) | 5% |
| 3-H1OCro(7F,8F)-5 | (3-14) | 3% |
| 5-HchB(2F,3F)-O2 | (3-17) | 3% |
| 3-HBB-2 | (4-5) | 8% |
| F3-HH-V | (—) | 3% |
| 3-HDhB(2F,3F)-O2 | (—) | 3% |
| 3-dhBB(2F,3F)-O2 | (—) | 3% |

NI = 84.5° C.; Tc < −20° C.; η = 17.4 mPa · s; Δn = 0.102; Δε = −3.7.

Example 9

| | | |
|---|---|---|
| 3-DhB(F)B(2F,3F)-O4 | (1-1) | 5% |
| 3-dhB (2F)B(2F,3F)-O2 | (1-5) | 4% |
| 5-dhB(2F)B(2F,3F)-O2 | (1-5) | 4% |
| 3-HH-V | (2) | 20% |
| 3-HH-V1 | (2) | 5% |
| 5-HB(2F,3F)-O2 | (3-1) | 5% |
| 3-H1OB(2F,3F)-O2 | (3-3) | 5% |
| 3-BB(2F,3F)-O2 | (3-4) | 6% |
| 2O-BB(2F,3F)-O2 | (3-4) | 5% |
| 4-HHB(2F,3F)-O2 | (3-6) | 3% |
| V-HHB(2F,3F)-O2 | (3-6) | 10% |
| 3-HBB(2F,3F)-O2 | (3-10) | 5% |
| 4-HBB(2F,3F)-O2 | (3-10) | 5% |
| 1V2-BB-1 | (4-2) | 3% |
| 3-HHEBH-4 | (4-10) | 3% |
| 5-HBB(F)B-3 | (4-12) | 3% |
| 5-HH-V | (—) | 3% |
| 2-HH-5 | (—) | 3% |
| 3-HH-4 | (—) | 3% |

NI = 84.3° C.; Tc < −20° C.; η = 16.9 mPa · s; Δn = 0.112; Δε = −3.9.

Example 10

| | | |
|---|---|---|
| 5-DhB(2F)B(2F,3F)-O2 | (1-2) | 5% |
| 3-DhB(2F,3F)B(2F,3F)-O2 | (1-3) | 5% |
| 3-HH-V | (2) | 31% |
| 3-HB(2F,3F)-O2 | (3-1) | 10% |
| 3-H2B(2F,3F)-O2 | (3-2) | 4% |
| 2O-BB(2F,3F)-O2 | (3-4) | 5% |
| 3-HHB(2F,3F)-O2 | (3-6) | 12% |
| 2-BB(2F,3F)B-3 | (3-9) | 3% |
| 2-BB(2F,3F)B-4 | (3-9) | 3% |
| V-HBB(2F,3F)-O2 | (3-10) | 5% |
| 3-HEB(2F,3F)B(2F,3F)-O2 | (3-11) | 5% |
| V2-HchB(2F,3F)-O2 | (3-17) | 3% |
| 5-B(F)BB-2 | (4-7) | 3% |
| 3-HHEBH-5 | (4-10) | 3% |
| 5-HH-O1 | (—) | 3% |

NI = 81.2° C.; Tc < −20° C.; η = 17.8 mPa · s; Δn = 0.111; Δε = −3.8.

Example 11

| | | |
|---|---|---|
| 3-DhB(2F)B(2F,3F)-O2 | (1-2) | 3% |
| 3-DhB(2F)B(2F,3F)-O4 | (1-2) | 3% |
| 3-dhB(2F)B(2F,3F)-O2 | (1-5) | 6% |
| 3-HH-V | (2) | 20% |
| 3-HH-2 | (2) | 10% |
| 5-HB(2F,3F)-O2 | (3-1) | 5% |
| 3-BB(2F,3F)-O2 | (3-4) | 5% |
| 2-HHB(2F,3F)-O2 | (3-6) | 5% |
| V-HHB(2F,3F)-O2 | (3-6) | 5% |
| V-HHB(2F,3F)-O4 | (3-6) | 5% |
| 3-HBB(2F,3F)-O2 | (3-10) | 10% |
| 5-HBB(2F,3F)-O2 | (3-10) | 5% |
| 7-HB-1 | (4-1) | 3% |
| 1-BB-3 | (4-2) | 3% |
| 3-HHEH-5 | (4-3) | 3% |
| 3-HHB-3 | (4-4) | 3% |
| V2-HHB-1 | (4-4) | 3% |
| 2-BB(F)B-3 | (4-6) | 3% |

NI = 84.1° C.; Tc < −20° C.; η = 15.3 mPa · s; Δn = 0.110; Δε = −3.3.

Example 12

| | | |
|---|---|---|
| 3-DhB(F)B(2F,3F)-O1 | (1-1) | 5% |
| 3-dhB(2F,3F)B(2F,3F)-O2 | (1-6) | 5% |
| 3-HH-V | (2) | 30% |
| 3-HH-V1 | (2) | 5% |
| 3-HB(2F,3F)-O2 | (3-1) | 10% |
| 2O-BB(2F,3F)-O2 | (3-4) | 5% |
| 3-HHB(2F,3F)-O2 | (3-6) | 7% |
| 3-HBB(2F,3F)-O2 | (3-10) | 8% |
| V-HBB(2F,3F)-O2 | (3-10) | 5% |
| 3-H1OCro(7F,8F)-5 | (3-14) | 3% |
| 3-HH1OCro(7F,8F)-5 | (3-15) | 3% |
| 3-HHB-O1 | (4-4) | 3% |
| VFF-HHB-1 | (4-4) | 3% |
| V-HBB-3 | (4-5) | 5% |
| 2-BB(F)B-5 | (4-6) | 3% |

NI = 81.8° C.; Tc < −20° C.; η = 16.7 mPa · s; Δn = 0.110; Δε = −3.5.

Example 13

| | | |
|---|---|---|
| 3-dhB(F)B(2F,3F)-O2 | (1-4) | 6% |
| 3-dhB(2F)B(2F,3F)-O2 | (1-5) | 6% |
| 3-HH-V | (2) | 27% |
| 3-HH-2 | (2) | 5% |
| 2-H1OB(2F,3F)-O2 | (3-3) | 3% |
| 3-H1OB(2F,3F)-O2 | (3-3) | 3% |
| 3-BB(2F,3F)-O2 | (3-4) | 5% |
| 2-HHB(2F,3F)-O2 | (3-6) | 5% |
| 3-HHB(2F,3F)-O2 | (3-6) | 8% |
| 4-HHB(2F,3F)-O2 | (3-6) | 5% |
| 2-BB(2F,3F)B-3 | (3-9) | 3% |
| 2-HBB(2F,3F)-O2 | (3-10) | 5% |
| 3-HBB(2F,3F)-O2 | (3-10) | 5% |
| 5-HBB(2F,3F)-O2 | (3-10) | 5% |
| 3-chB(2F,3F)-O2 | (3-16) | 3% |
| 3-HB-O2 | (4-1) | 3% |
| V-HBB-2 | (4-5) | 3% |

NI = 81.1° C.; Tc < −20° C.; η = 16.1 mPa · s; Δn = 0.110; Δε = −3.8.

Example 14

| | | |
|---|---|---|
| 3-DhB(2F)B(2F,3F)-O1 | (1-2) | 5% |
| 3-DhB(2F,3F)B(2F,3F)-O2 | (1-3) | 5% |
| 3-HH-V | (2) | 22% |
| 3-HH-V1 | (2) | 9% |
| 3-HB(2F,3F)-O2 | (3-1) | 10% |
| 5-HB(2F,3F)-O2 | (3-1) | 5% |
| 5-BB(2F,3F)-O2 | (3-4) | 5% |
| 3-HHB(2F,3F)-O2 | (3-6) | 8% |
| V-HHB(2F,3F)-O2 | (3-6) | 3% |
| 3-HBB(2F,3F)-O2 | (3-10) | 8% |
| 4-HBB(2F,3F)-O2 | (3-10) | 3% |
| V-HBB(2F,3F)-O2 | (3-10) | 5% |
| 1-BB-3 | (4-2) | 3% |
| 3-HHB-1 | (4-4) | 3% |
| VFF2-HHB-1 | (4-4) | 3% |
| 3-HH-O1 | (—) | 3% |

NI = 75.3° C.; Tc < −20° C.; η = 15.1 mPa · s; Δn = 0.105; Δε = −3.8.

Example 15

| | | |
|---|---|---|
| 3-dhB(F)B(2F,3F)-O2 | (1-4) | 5% |
| 3-dhB(2F)B(2F,3F)-O2 | (1-5) | 5% |
| 3-HH-V | (2) | 28% |
| V-HB(2F,3F)-O2 | (3-1) | 5% |
| 3-H2B(2F,3F)-O2 | (3-2) | 5% |
| 2-HHB(2F,3F)-O2 | (3-6) | 5% |
| 4-HHB(2F,3F)-O2 | (3-6) | 6% |
| 2-HH1OB(2F,3F)-O2 | (3-8) | 3% |
| 3-HH1OB(2F,3F)-O2 | (3-8) | 3% |
| 2-BB(2F,3F)B-3 | (3-9) | 3% |
| 3-HBB(2F,3F)-O2 | (3-10) | 7% |
| 5-HBB(2F,3F)-O2 | (3-10) | 7% |
| V2-HchB(2F,3F)-O2 | (3-17) | 4% |
| 3-HB-O2 | (4-1) | 6% |
| 5-HB-O2 | (4-1) | 3% |
| 1V2-HH-2V1 | (—) | 5% |

NI = 84.3° C.; Tc < −20° C.; η = 14.1 mPa · s; Δn = 0.104; Δε = −3.6.

The viscosity in Comparative example 1 was 43.8 mPa·s. In contrast, the viscosity in Examples 1 to 15 was 14.1 to 20.0 mPa·s. The results show that the compositions in Examples have a small viscosity in comparison with Comparative example. We conclude that the liquid crystal composition of the invention has superior characteristics.

INDUSTRIAL APPLICABILITY

The liquid crystal composition of the invention can be used for a liquid crystal projector, a liquid crystal television and so forth.

What is claimed is:

1. A liquid crystal composition having negative dielectric anisotropy and consisting of at least one compound selected from compounds represented by formula (1) as a first component and at least one compound selected from compounds represented by formula (2) as a second component, at least one compound selected from compounds represented by formula (3) as a third component, at least one compound selected from compounds represented by formula (4) as a fourth component, and optionally at least one compound selected from polymerizable compounds represented by formula (5) as an additive:

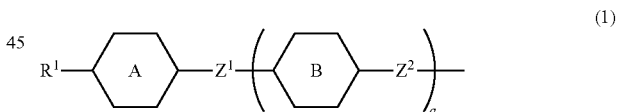

(1)

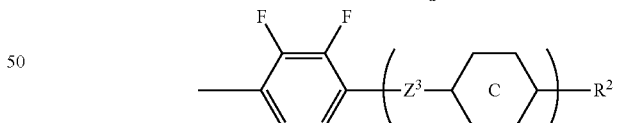

(2)

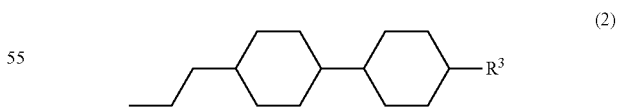

(3)

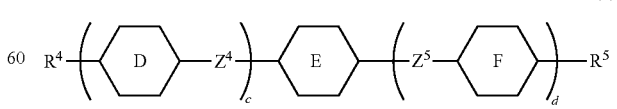

(4)

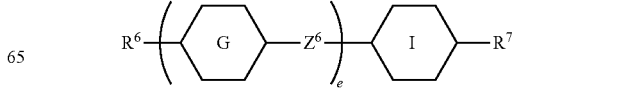

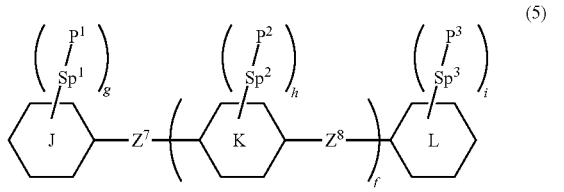

in formula (1) and formula (2), $R^1$ and $R^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine; $R^3$ is vinyl or 1-propenyl; ring A is tetrahydropyran-2,5-diyl; ring B and ring C are independently 2-fluoro-1,4-phenylene or 2,3-difluoro-1,4-phenylene; $Z^1$, $Z^2$ and $Z^3$ are independently a single bond, ethylene, carbonyloxy or methyleneoxy; and one of a and b is 0, and the other is 1, wherein a ratio of the second component is in a range of 15% by weight to 70% by weight, in formula (3), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine; ring D and ring F are independently 1,4-cyclohexylene, 1,4-cyclohexenylene, 1,4-phenylene, 1,4-phenylene in which at least one hydrogen has been replaced by fluorine, naphthalene-2,6-diyl, naphthalene-2,6-diyl in which at least one hydrogen has been replaced by fluorine, chromane-2,6-diyl or chromane-2,6-diyl in which at least one hydrogen has been replaced by fluorine; ring E is 2,3-difluoro-1,4-phenylene, 2,3-difluoro-5-methyl-1,4-phenylene, 3,4,5-trifluoronaphthalene-2,6-diyl or 7,8-difluorochromane-2,6-diyl; $Z^4$ and $Z^5$ are independently a single bond, ethylene, carbonyloxy or methyleneoxy; and c is 1, 2 or 3, d is 0 or 1, and the sum of c and d is 3 or less, in formula (4), $R^6$ and $R^7$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine; ring G and ring I are independently 1,4-cyclohexylene, 1,4-phenylene, 2-fluoro-1,4-phenylene or 2,5-difluoro-1,4-phenylene; $Z^6$ is a single bond, ethylene or carbonyloxy; e is 1, 2 or 3; and ring I is 1,4-phenylene when e is 1, in formula (5), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^7$ and $Z^8$ are independently a single bond or alkylene having 1 to 10 carbons, and in the alkylene at least one —$CH_2$— may be replaced by —O—, —CO—, —COO— or —OCO— and at least one —$CH_2$—$CH_2$— may be replaced by —CH=CH—, —C($CH_3$)=CH—, —CH=C($CH_3$)— or —C($CH_3$)=C($CH_3$)—, and in these groups at least one hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO— and at least one —$CH_2$—$CH_2$— may be replaced by —CH=CH— or —C≡C—, and in these groups at least one hydrogen may be replaced by fluorine or chlorine; f is 0, 1 or 2; and g, h and i are independently 0, 1, 2, 3 or 4, and the sum of g, h and i is 1 or more.

2. The liquid crystal composition according to claim 1, including at least one compound selected from the group of compounds represented by formula (1-1) to formula (1-6) as the first component:

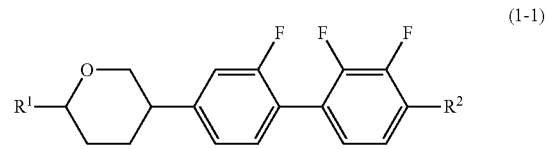

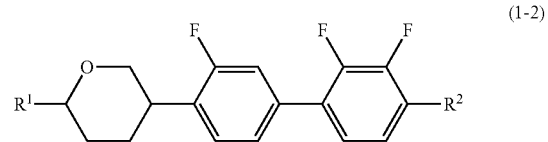

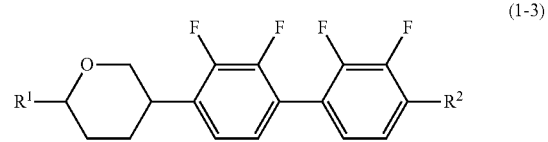

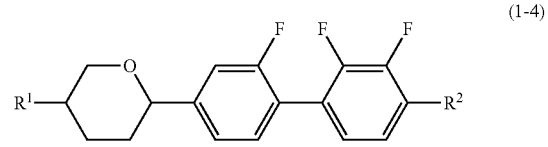

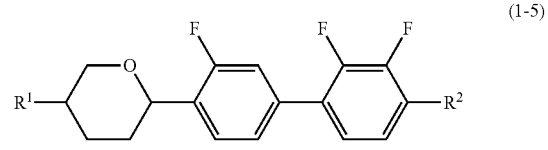

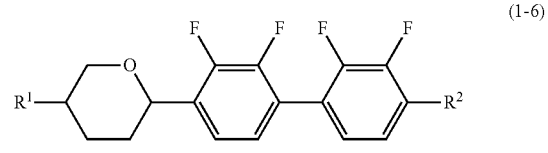

in formula (1-1) to formula (1-6), $R^1$ and $R^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine.

3. The liquid crystal composition according to claim 1, wherein the ratio of the first component is in the range of 5% by weight to 25% by weight.

4. The liquid crystal composition according to claim 1, including at least one compound selected from the group of compounds represented by formula (3-1) to formula (3-20) as the third component:

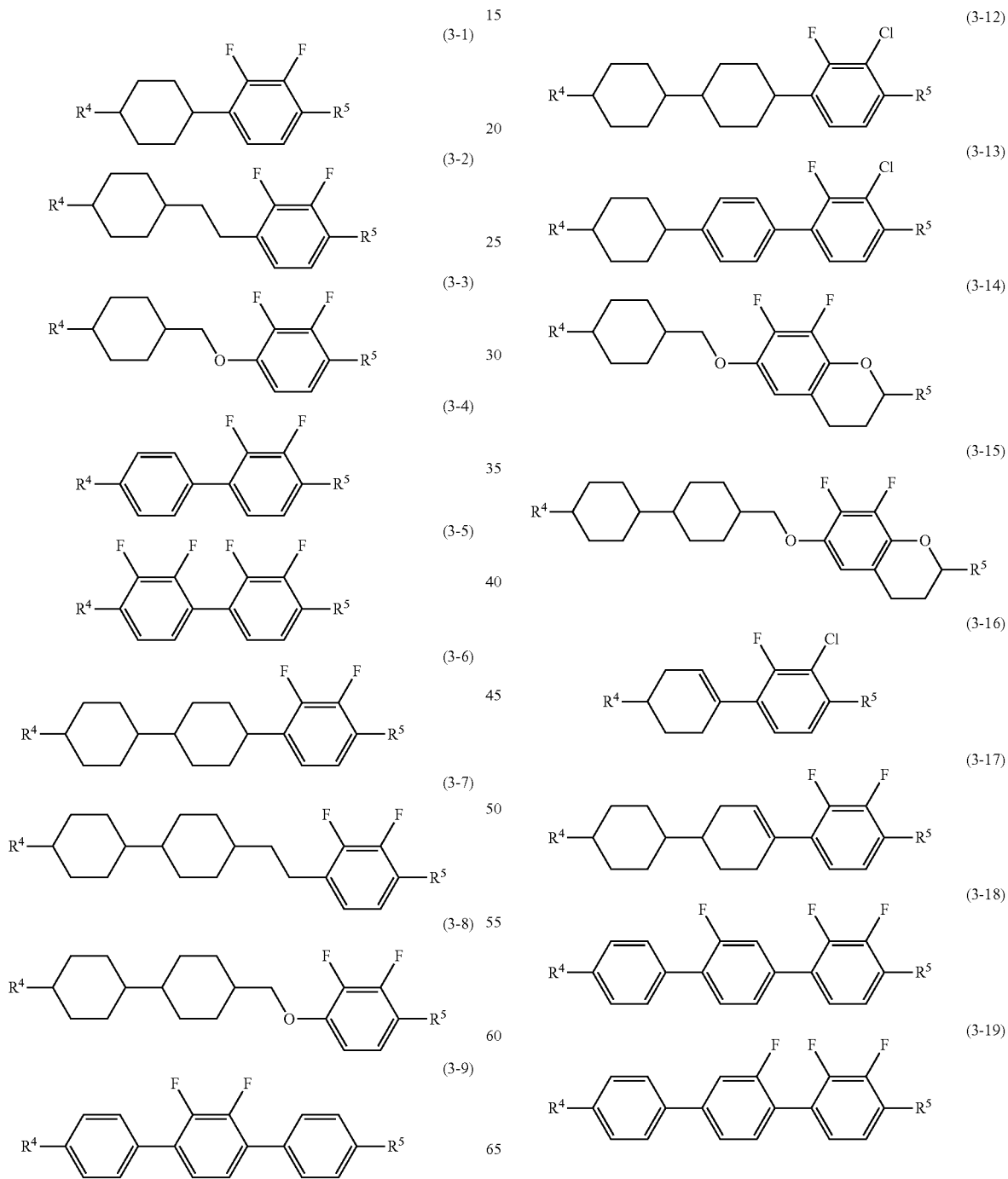

(3-20)

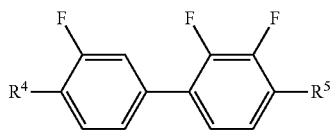

in formula (3-1) to formula (3-20), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine.

5. The liquid crystal composition according to claim 1, wherein the ratio of the third component is in the range of 20% by weight to 75% by weight.

6. The liquid crystal composition according to claim 1, including at least one compound selected from the group of compounds represented by formula (4-1) to formula (4-12) as the fourth component:

(4-1)
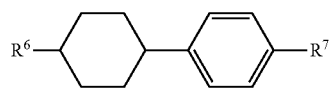

(4-2)
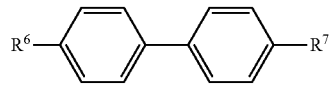

(4-3)
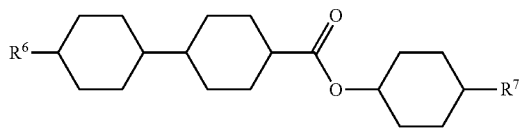

(4-4)
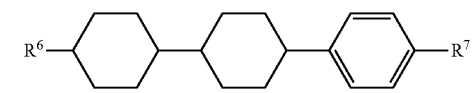

(4-5)
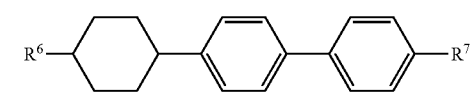

(4-6)
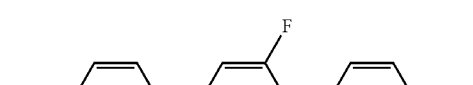

(4-7)
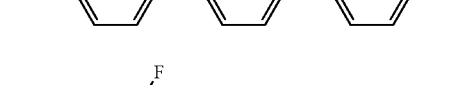

(4-8)
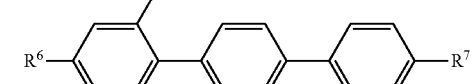

(4-9)
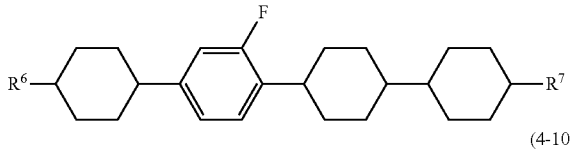

(4-10)
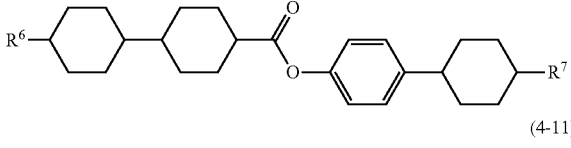

(4-11)
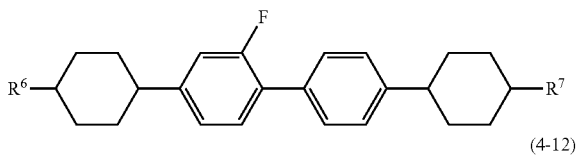

(4-12)
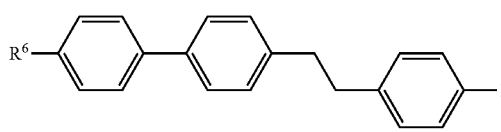

in formula (4-1) to formula (4-12), $R^6$ and $R^7$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine.

7. The liquid crystal composition according to claim 1, wherein the ratio of the fourth component is in the range of 2% by weight to 30% by weight.

8. The liquid crystal composition according to claim 1, wherein in formula (5), $P^1$, $P^2$ and $P^3$ are independently a group selected from the group of polymerizable groups represented by formula (P-1) to formula (P-5):

(P-1)
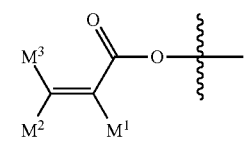

(P-2)
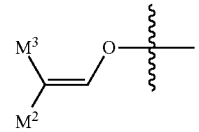

(P-3)
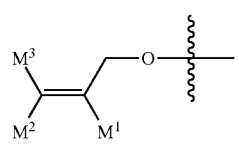

(P-4)
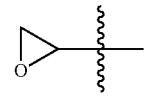

(P-5)

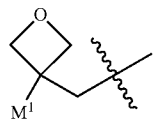

in formula (P-1) to formula (P-5), $M^1$, $M^2$ and $M^3$ are independently hydrogen, fluorine, alkyl having 1 to 5 carbons or alkyl having 1 to 5 carbons in which at least one hydrogen has been replaced by fluorine or chlorine.

9. The liquid crystal composition according to claim 1, including at least one compound selected from the group of polymerizable compounds represented by formula (5-1) to formula (5-27) as the additive:

(5-1)
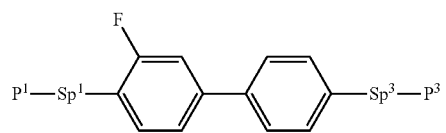

(5-2)

(5-3)

(5-4)
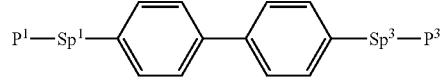

(5-5)
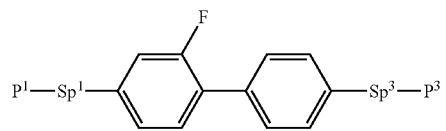

(5-6)

(5-7)
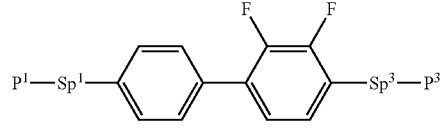

(5-8)

(5-9)
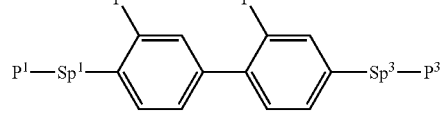

(5-10)
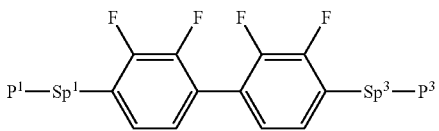

(5-11)

(5-12)
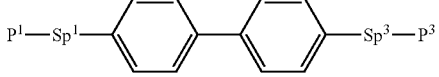

(5-13)
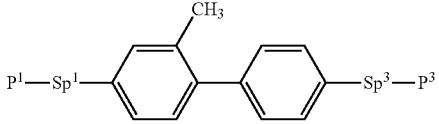

(5-14)

(5-15)
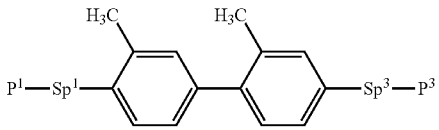

(5-16)
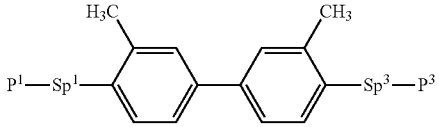

(5-17)

(5-18)
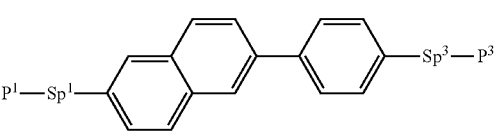

(5-19)
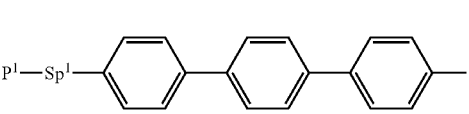

(5-20)
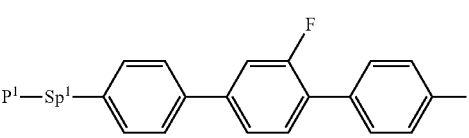

-continued (5-21) 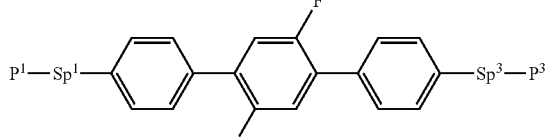

(5-22) 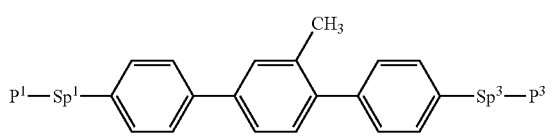

(5-23) 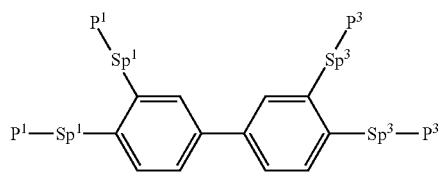

(5-24) 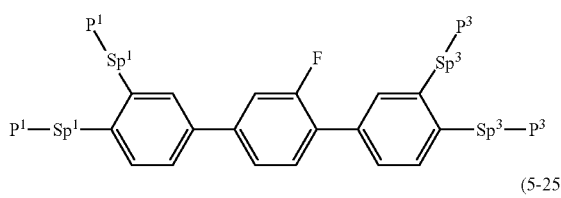

(5-25) 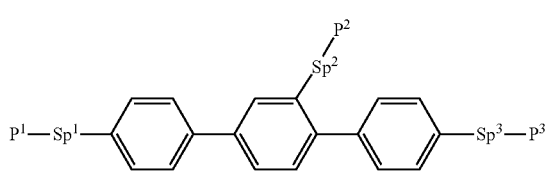

(5-26) 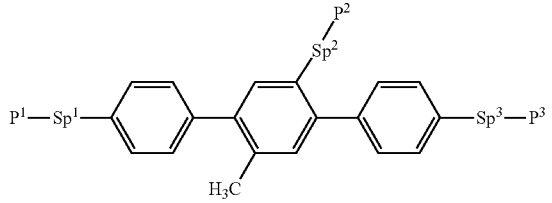

(5-27) 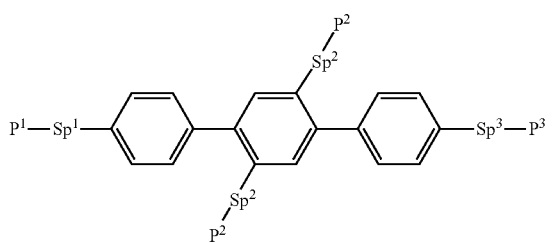

in formula (5-1) to formula (5-27), $P^1$, $P^2$ and $P^3$ are independently a group selected from the group of polymerizable groups represented by formula (P-1) to formula (P-3);

(P-1) 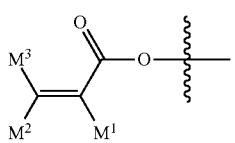

(P-2) 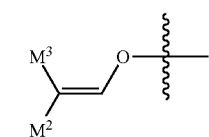

(P-3) 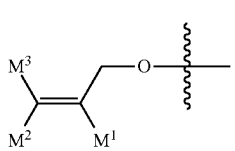

wherein, $M^1$, $M^2$ and $M^3$ are independently hydrogen, fluorine, alkyl having 1 to 5 carbons or alkyl having 1 to 5 carbons in which at least one hydrogen has been replaced by fluorine or chlorine; and $Sp^1$, $Sp^2$ and $Sp^a$ are independently a single bond or alkylene having 1 to 10 carbons, and in the alkylene at least one —$CH_2$— may be replaced by —O—, —COO—, —OCO— or —OCOO— and at least one —$CH_2$—$CH_2$— may be replaced by —CH=CH— or and in these groups at least one hydrogen may be replaced by fluorine or chlorine.

10. The liquid crystal composition according to claim 1, wherein the ratio of the additive is in the range of 0.03% by weight to 10% by weight.

11. A liquid crystal display device including the liquid crystal composition according to claim 1.

12. The liquid crystal display device according to claim 11, wherein the operating mode of the liquid crystal display device is an IPS mode, a VA mode, an FFS mode or an FPA mode, and the driving mode of the liquid crystal display device is an active matrix mode.

13. A liquid crystal display device with a polymer sustained alignment type including a liquid crystal composition according to claim 1, wherein the additive included in the liquid crystal composition has been polymerized.

* * * * *